US009585096B2

(12) United States Patent
Takano

(10) Patent No.: US 9,585,096 B2
(45) Date of Patent: *Feb. 28, 2017

(54) COMMUNICATION DEVICE, COMMUNICATION METHOD, COMMUNICATION SYSTEM, AND BASE SYSTEM

(71) Applicant: Sony Corporation, Tokyo (JP)

(72) Inventor: Hiroaki Takano, Saitama (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/088,968

(22) Filed: Apr. 1, 2016

(65) Prior Publication Data

US 2016/0219513 A1 Jul. 28, 2016

Related U.S. Application Data

(63) Continuation of application No. 14/123,382, filed as application No. PCT/JP2012/005227 on Aug. 21, 2012, now Pat. No. 9,363,751.

(30) Foreign Application Priority Data

Sep. 1, 2011 (JP) ................................ 2011-190522

(51) Int. Cl.
*H04W 52/02* (2009.01)
*H04W 4/00* (2009.01)

(52) U.S. Cl.
CPC ....... *H04W 52/0216* (2013.01); *H04W 4/005* (2013.01); *H04W 52/0229* (2013.01); *H04W 52/029* (2013.01)

(58) Field of Classification Search
CPC .......................... H04W 52/0216; H04W 4/005
See application file for complete search history.

(56) References Cited

U.S. PATENT DOCUMENTS 6,567,376 B1 5/2003 Karlsson et al.
7,734,264 B2 6/2010 Rao
(Continued)

FOREIGN PATENT DOCUMENTS

CN 101170775 4/2008
EP 1 230 599 8/2002
(Continued)

OTHER PUBLICATIONS

Combined Chinese Office Action and Search Report issued Jan. 19, 2015, in Patent Application No. 201280040936.6 (with English language translation).
(Continued)

*Primary Examiner* — Melvin Marcelo
(74) *Attorney, Agent, or Firm* — Oblon, McClelland, Maier & Neustadt, L.L.P.

(57) ABSTRACT

A communication device, system and method cooperate to transmit a signal from a base station, where the signal includes a current frame and a target frame. A counting unit counts a frame period and a reception control unit causes the receiving unit to transition to a sleep state. A reception control unit causes the receiving unit to return from the sleep state before a counting result of the counting unit reaches the target frame. The reception control unit also causes the receiving unit to return to the sleep state over a time period based on a difference between a current frame and the target frame.

21 Claims, 24 Drawing Sheets

(56) References Cited

U.S. PATENT DOCUMENTS

| | | |
|---|---|---|
| 2008/0056422 A1 | 3/2008 | Rao et al. |
| 2010/0197316 A1 | 8/2010 | Aoyama et al. |
| 2012/0170507 A1 | 7/2012 | Sawai |
| 2013/0301501 A1* | 11/2013 | Olvera-Hernandez  H04W 76/048 370/311 |
| 2014/0036825 A1 | 2/2014 | Sawai |
| 2014/0036826 A1 | 2/2014 | Sawai |
| 2014/0092859 A1 | 4/2014 | Takano |
| 2015/0173039 A1* | 6/2015 | Rune ................. H04W 52/0216 370/311 |

FOREIGN PATENT DOCUMENTS

| | | |
|---|---|---|
| EP | 2 057 748 | 5/2009 |
| JP | 2005-516565 | 6/2005 |
| JP | 2009-219091 | 9/2009 |
| JP | 2009-231866 | 10/2009 |
| JP | 2009-290826 | 12/2009 |
| JP | 2011-501556 | 1/2011 |
| JP | 2011-71706 | 4/2011 |
| WO | WO 2008/027915 | 3/2008 |
| WO | WO 2011/036831 | 3/2011 |

OTHER PUBLICATIONS

Japanese Office Action issued Sep. 16, 2014 in Patent Application No. 2011-190522 (without English Translation).
International Search Report issued Sep. 25, 2012 in PCT/JP2012/005227.
Extended Search Report issued Apr. 16, 2015 in European Patent Application No. 12827734.0.
Office Action issued Nov. 17, 2015 in Japanese Patent Application No. 2014-266215.
Office Action issued Apr. 26, 2016 in Japanese Patent Application No. 2014-266215.

* cited by examiner

COMMUNICATION DEVICE, COMMUNICATION METHOD, COMMUNICATION SYSTEM, AND BASE SYSTEM

CROSS-REFERENCE TO RELATED APPLICATIONS

This application is a continuation of U.S. application Ser. No. 14/123,382 filed Dec. 2, 2013, the entire content of which are incorporated herein by reference. U.S. application Ser. No. 14/123,382 is a National Stage of PCT/JP12/005227 filed Aug. 21, 2012, which is based upon and claims the benefit of priority from prior Japanese Patent Application No. 2011-190522 filed Sep. 1, 2011.

TECHNICAL FIELD

The present disclosure relates to a communication device, a communication method, a communication system, and a base station.

BACKGROUND ART

Currently, in the Third Generation Partnership Project (3GPP), standardization of a 4G wireless communication system (LTE-Advanced) of a next generation type is in progress. In the 4G, it is under consideration to introduce techniques such as multi user-MIMO (MU-MIMO) and coordinated multi points transmission (CoMP) in order to improve a maximum communication rate and the quality at a cell edge.

In the LTE, a radio frame of 10 ms and 10 sub frames configuring the radio frame of 10 ms are defined. Each sub frame includes a control area used to transmit a control signal (PDCCH) and a data area used to transmit user data (PDSCH). For example, Patent Document 1 discloses this frame structure.

Meanwhile, in the 3GPP, machine type communications (MTC) have been discussed. Generally, the MTC has the same meaning as machine to machine (M2M) and refers to communication between machines, which is not used directly by human. Usually, the MTC is performed between a server and an MTC terminal which is not used directly by human. In the MTC, communication may be performed at a long period such as one week or one month.

CITATION LIST

Patent Document

Patent Document 1: Japanese Patent Application Laid-Open No. 2011-071706

SUMMARY

Problems to be Solved

However, since an oscillator installed in a communication device including an MTC terminal has an error, it is difficult for the communication device to accurately return from a sleep state at a target frame after a long time, such as one week or one month, elapses. For example, there may occur a case in which a target frame has already passed when the communication device returns.

In this regard, the present disclosure proposes a communication device, a communication method, a communication system, and a base station, which are novel and improved and which are capable of more reliably receiving a target frame.

Solutions to Problems

According to the present disclosure, there is provided a communication device including a receiving unit that receives a signal from a base station, a counting unit that counts a frame period, and a reception control unit that causes the receiving unit to transition to a sleep state, wherein the reception control unit causes the receiving unit to return from the sleep state before a counting result of the counting unit reaches a target frame and causes the receiving unit to transition to the sleep state again over a time period corresponding to a difference between a current frame and the target frame.

Further, according to the present disclosure, there is provided a communication method that includes, receiving a signal, counting a frame period, causing a receiving unit to transition to a sleep state, causing the receiving unit to return from the sleep state before a counting result reaches a target frame, and transitioning the receiving unit again to the sleep state over a time period corresponding to a difference between a current frame and the target frame.

Further, according to the present disclosure, there is provided a communication system including a base station with a signal generation unit, and a communication device including a receiving unit that receives a signal from the base station, a counting unit that counts a frame period, and a reception control unit that causes the receiving unit to transition to a sleep state, wherein the reception control unit causes the receiving unit to return from the sleep state before a counting result of the counting unit reaches a target frame and causes the receiving unit to transition to the sleep state again over a time period corresponding to a difference between a current frame and the target frame.

Further, according to the present disclosure, there is provided a communication device having a signal generation unit that generates a signal transmitted to a communication device in a target frame, the receives device causing a receiving unit to return from the sleep state before a frame counting result reaches the target frame and causing the receiving unit to transition to the sleep state again over a time period corresponding to a difference between a current frame and the target frame.

Further, according to the present disclosure, there is provided a communication method including transmitting a signal to a communication device in a target frame that causes a receiving unit to return from the sleep state before a frame counting result reaches the target frame and causing the receiving unit to transition to the sleep state again over a time period corresponding to a difference between a current frame and the target frame.

Effects

As described above, according to the present disclosure, a target frame can be more reliably received.

TECHNICAL DESCRIPTION

Figure 1:
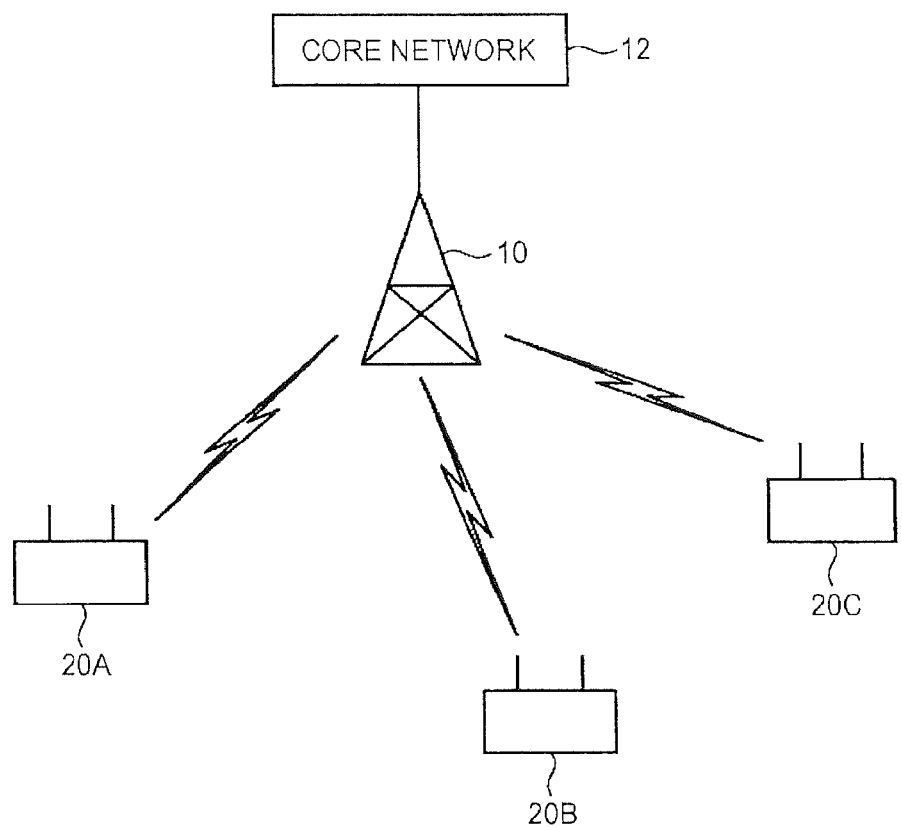
FIG. 1 is an explanatory diagram illustrating a configuration of a communication system according to an embodiment of the present disclosure.

Hereinafter, exemplary embodiments of the present disclosure will be described in detail with reference to the accompanying drawings. In the disclosure and drawings, components having substantially the same functional configuration are denoted by the same reference numerals, and the redundant description will not be repeated.

Further, in the disclosure and drawings, a plurality of components having substantially the same functional configuration are denoted by the same reference numerals and followed by different alphabets for distinction. For example, a plurality of components having substantially the same functional configuration may be distinguished from each other in the form of UEs 20A, 20B, and 20C as necessary. However, when a plurality of components having substantially the same functional configuration need not be distinguished from each other, they are denoted by the same reference numerals. For example, when UEs 20A, 20B and 20C need not be particularly distinguished from each other, they are referred to simply as UE 20.

The present disclosure will be described below in the following order of sections.

1. Outline of Wireless Communication System
1-1. Configuration of Wireless Communication System
1-2. Frame Structure
1-3. System Frame Number (SFN)
1-4. Background
2. First Embodiment
2-1. Configuration of Base Station According to First embodiment
2-2. Configuration of UE According to First embodiment
2-3. Operation According to First Embodiment
3. Second Embodiment
3-1. Configuration of Base Station According to Second embodiment
3-2. Modified Embodiment of Second Embodiment
4. Third Embodiment
4-1. Configuration of UE According to Third embodiment
4-2. Operation According to Third Embodiment
4-3. Modified Embodiment
5. Conclusion 1. Outline of Wireless Communication System A technology according to the present disclosure can be embodied in various forms as will be described in detail in "2. First Embodiment" to "4. Third Embodiment" as examples. First, an outline of a wireless communication system which is common to the embodiments will be described below.

1-1. Configuration of Wireless Communication System

FIG. 1 is an explanatory diagram illustrating a configuration of a communication system 1 according to an embodiment of the present disclosure. As illustrated in FIG. 1, the communication system 1 according to an embodiment of the present disclosure includes a base station 10, a core network 12, and user equipments (UEs) 20A to 20C.

The UE 20 is a communication device that performs a reception process in a downlink resource block assigned by the base station 10 and performs a transmission process in an uplink resource block.

For example, the UE 20 may be an information processing apparatus such as a smart phone, a personal computer (PC), a home video processing apparatus (a digital versatile disc (DVD) recorder, a video cassette recorder (VCR), or the like), a personal digital assistant (PDA), a home game machine, or a home appliance. Further, the UE 20 may be a mobile communication device such as a portable telephone, a personal handy phone system (PHS), a portable music player, a portable video processing apparatus, or a portable game machine.

In addition, the UE 20 may be an MTC terminal. The MTC terminal is a wireless terminal which has been discussed in the 3GPP and which is specialized in MTC, which is communication between machines and is not used directly by human. For example, as a medical MTC application, an MTC terminal may collect electrocardiogram information of human and then transmit the electrocardiogram information via an uplink channel when a certain trigger condition is satisfied. As another MTC application, an automatic vending machine may function as an MTC terminal, and the MTC terminal may transmit information about stock or sales of the automatic vending machine via an uplink channel.

For example, the MTC terminals generally have the following features. However, each MTC terminal needs not to have all of the following features, and a feature included in each MTC terminal is decided depending on an application.

There is little moving (Low Mobility)
Small amount of data transmission (Online Small Data Transmission)
Extra-Low Power Consumption
MTC are grouped and handled (Group-based MTC Features)

When the MTC terminals concurrently transmit transmission and reception requests to the base station 10, there is a concern that the base station 10 or the core network 12 may undergo congestion. Further, in order to promote the widespread use of the MTC terminal, it is desirable not only to lower the cost but also to cause the MTC terminal to coexist with a portable telephone terminal. Thus, it is unlikely that a cellular network of only MTC terminals will be constructed.

The base station 10 is a radio base station that communicates with the UE 20 located in the coverage. The base station 10 may be an eNodeB, a relay node, a femto cell base station, a remote radio head (RRH), or a pico eNodeB. FIG. 1 illustrates an example in which only one base station 10 is connected to the core network 12 but, in reality, many base stations 10 are connected to the core network 12.

The core network 12 is a service provider side network including a management node such as a mobility management entity (MME) or a serving gateway (GW). The MME is an apparatus that sets and opens a data communication session, and controls a handover. The MME is connected to the eNodeB 10 through an interface called X2. The S-GW is an apparatus that performs routing and transmission of user data or the like.

1-2. Frame Structure

Next, a structure of a frame shared between the base station 10 and the UE will be described.

Figure 2:
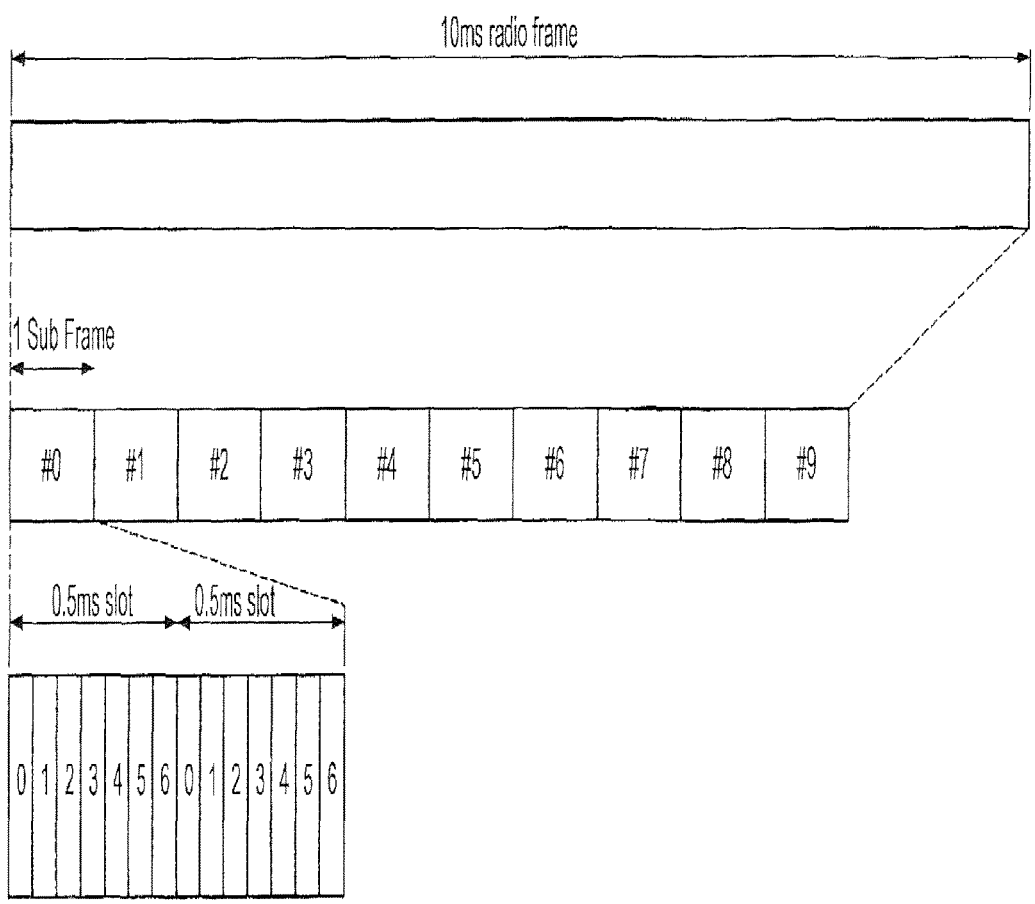
FIG. 2 is an explanatory diagram illustrating a frame format.

FIG. 2 is an explanatory diagram illustrating a frame format. As illustrated in FIG. 2, a radio frame of 10 ms includes 10 sub frames #0 to #9, each having a length of 1 ms. Each sub frame refers to a resource block including 12 sub carriers×14 orthogonal frequency division multiplexing (OFDM) symbols, and assignment of scheduling is performed in units of the resource blocks. Further, 1 OFDM symbol functions not only as a unit used in a communication scheme of an OFDM modulation scheme, but also a unit in which data processed by single fast Fourier transform (FFT) is output.

Figure 3A:
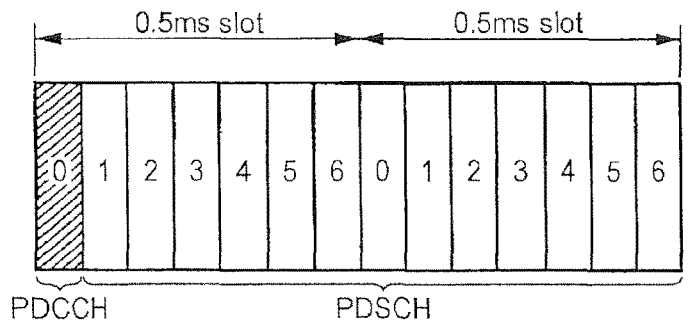
FIG. 3A is an explanatory diagram illustrating a configuration example of a sub frame.
Figure 3B:
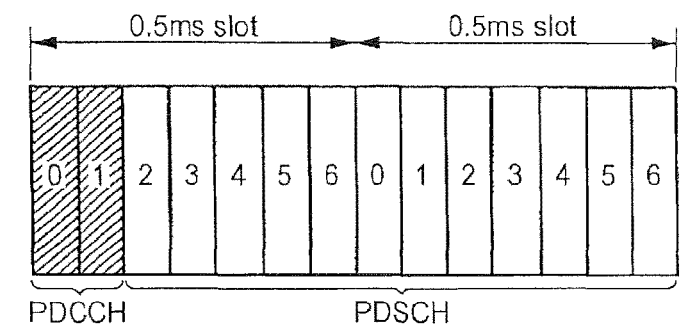
FIG. 3B is an explanatory diagram illustrating a configuration example of a sub frame.
Figure 3C:
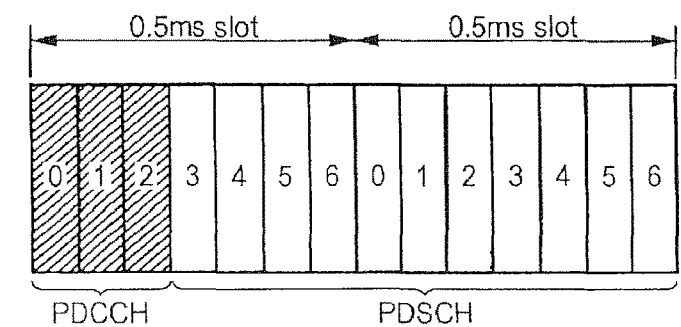
FIG. 3C is an explanatory diagram illustrating a configuration example of a sub frame.

Each sub frame is a unit frame including a control area and a data area. As illustrated in FIGS. 3A to 3C, the control area includes 1 to 3 OFDM symbols at the head of each sub frame and is used to transmit a control signal called a phy downlink control channel (PDCCH). The number of OFDM symbols used for the control area mainly depends on the number of the UEs 20. The data area following the control area is used to transmit, for example, user data called a phy downlink shared channel (PDSCH).

(Configuration of PDCCH)

The PDCCH includes downlink scheduling information (downlink assignment) and uplink scheduling information (uplink grants). The downlink scheduling information represents the position of a resource block to be received by the UE 20, and the uplink scheduling information represents the position of a resource block which is to be transmitted by the UE 20. The base station 10 assigns the downlink scheduling information and the uplink scheduling information to the UE 20 in light of a transmission line situation or the like.

Typically, the downlink scheduling information represents an assignment of a resource block in a sub frame in which a PDCCH including corresponding downlink scheduling information is arranged. Meanwhile, when the UE 20 receives the uplink scheduling information and then starts transmission, a delay time for preparation is necessary. Thus, the uplink scheduling information typically represents an assignment of a resource block after a fourth sub frame following a sub frame in which a PDCCH including corresponding uplink scheduling information is arranged.

The downlink scheduling information and the uplink scheduling information are main control signals included in the PDCCH, but the PDCCH also include other control signals such as ACK/NACK information and uplink power control information.

1-3. System Frame Number (SFN)

The structure of the radio frame has been described above with reference to FIGS. 2 and 3. A serial number of 0 to 1023 called a system frame number (SFN) is set to each radio frame. The SFN deeply relates to an embodiment of the present disclosure, and thus the SFN will be concretely described below.

The base station 10 broadcasts system information through a phy broadcast channel (PBCH). The system information mainly includes master information block (MIB) and system information block (SIB). Of these, information for specifying the SFN is included in the MIB.

The SFN of 0 to 1023 is represented by 10 bits, but an SFN of 8 bits (hereinafter, referred to as a "rough SFN") for specifying the SFN of 10 bits is included in an MIB. For this reason, the UE 20 can acquire an accurate SFN by interpolating the rough SFN using an internal counter. This point will be described below in further detail with reference to FIG. 4.

Figure 4:
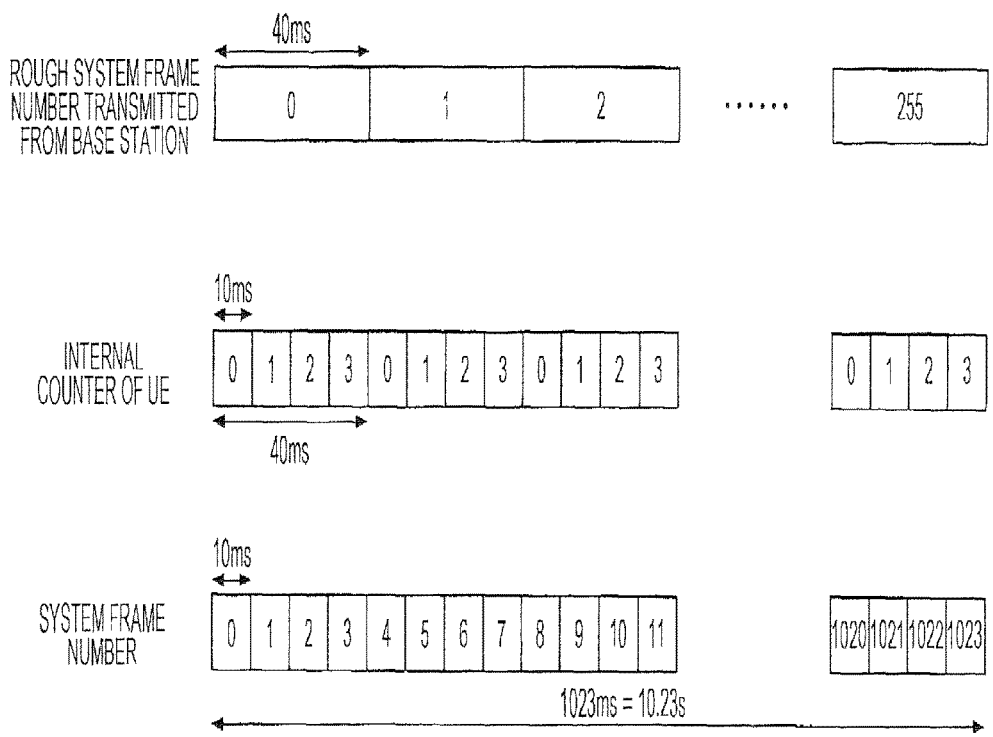
FIG. 4 is an explanatory diagram illustrating a method of sharing an SFN in user equipment (UE).

FIG. 4 is an explanatory diagram illustrating a method of sharing an SFN in the UE 20. As illustrated in FIG. 4, the base station 10 increases a rough SFN of 8 bits representing a value of 0 to 255 to a sum length of a specified number of radio frames, for example, 40 ms corresponding to a sum length of 4 radio frames once. Thus, the update frequency of the MIB can be reduced compared to when the SFN of bits is notified from the base station 10 side.

Meanwhile, the UE 20 may specify an SFN of 10 bits by counting a lapse of ms for a time period of the same rough SFN and then interpolating 2 bits. For example, the UE 20 can specify SFNs "4" to "7" by counting "0" to "3" at a period of 10 ms while the rough SFN is "1."

1-4. Background

The outline of the communication system 1 according to an embodiment of the present disclosure has been described above. Next, the background of embodiments of the present disclosure will be described before a detailed description of embodiments of the present disclosure.

The spread of an MTC terminal and an introduction of new techniques such as the MU-MIMO and the CoMP are behind the present disclosure. As described in "1-1. Configuration of Wireless Communication System," the MTC terminal can be disposed in equipment that does not involve human unlike a typical portable telephone terminal. For this reason, more MTC terminals than portable telephone terminals are expected to be on the market in the future. As a result, the anxiety about exhaustion of a control area to transmit a PDCCH is rising.

Similarly, as new techniques such as the MU-MIMO and the CoMP are introduced, control signals to implement the MU-MIMO and the CoMP increase, and concerns about shortage of a control area are raised.

On this point, a method of simply increasing a control area to 4 OFDM symbols or 5 OFDM symbols may be considered, but in this case, there occurs a problem in that the throughput is lowered since a data area to transmit a PDSCH is reduced.

Figure 5:
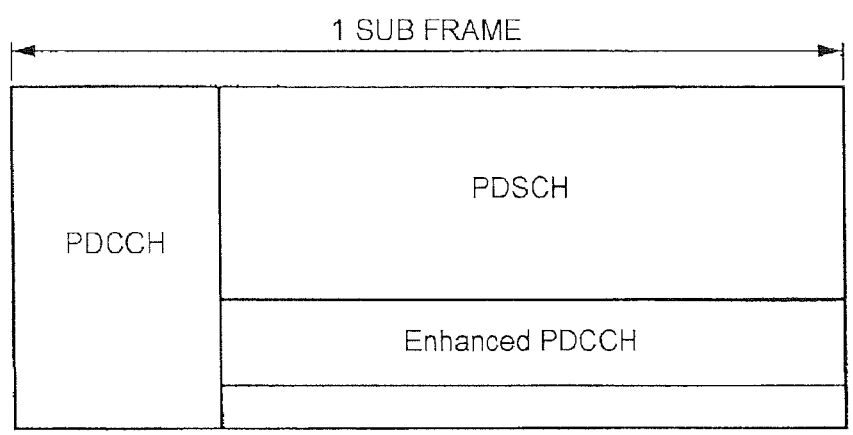
FIG. 5 is an explanatory diagram illustrating an extension example of a PDCCH.

Further, a method of disposing an extension area (enhanced PDCCH) of a PDCCH in a data area of each sub frame may be considered as illustrated in FIG. 5, but there similarly occurs a problem in that the throughput is lowered.

In this regard, embodiments of the present disclosure are made in light of the foregoing. According to an embodiment of the present disclosure, the control area can be appropriately extended to the inside of the data area. Hereinafter, techniques of the present disclosure including such an embodiment will be described in detail.

The following embodiments propose a unit to solve resource shortage of a PDCCH. However, since information related to paging is also included in a PDCCH, the embodiments of the present disclosure can be applied to paging. In other words, in a radio resource control (RRC)_Idle mode, the UE 20 intermittently receives paging information of a PDCCH (DRX: discontinues reception). Further, in an RRC_ Connected mode, the UE 20 receives a PDCCH at a DRX period for power saving. Thus, the technique related to the PDCCH of the present disclosure can be applied not only to the UE 20 in the RRC_Idle mode but also to the UE 20 in the RRC_Connected mode. The RRC_Idle mode refers to a state in which power of the UE 20 is saved. The UE 20 in the RRC_Idle mode monitors a paging channel from an eNodeB and transitions to the RRC_Connected mode when a call is included in the paging channel. The RRC_Connected mode refers to a state in which a connection is established between the UE 20 and the base station 10, and the UE 20 is able to transmit an uplink signal and receive a downlink signal.

2. First Embodiment

2-1. Configuration of Base Station According to First Embodiment

Figure 6:
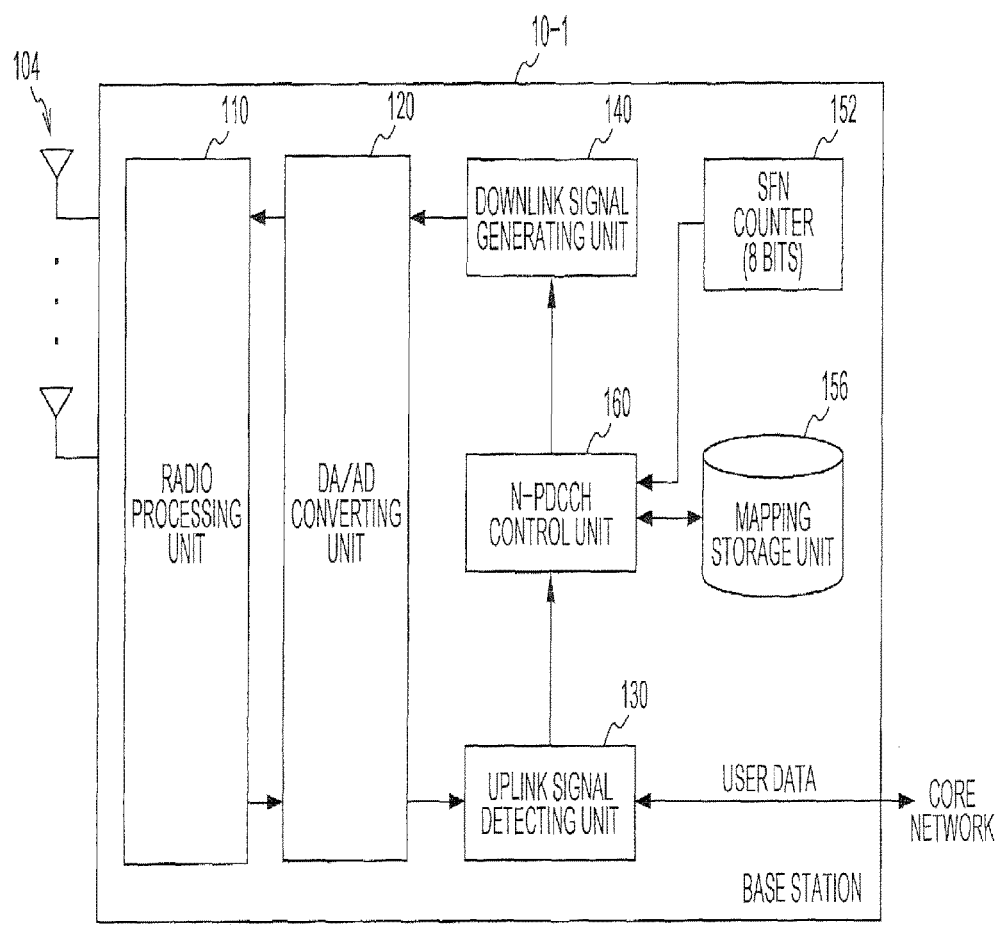
FIG. 6 is a functional block diagram illustrating a configuration of a base station according to a first embodiment.

FIG. 6 is a functional block diagram illustrating a configuration of a base station 10-1 according to a first embodiment. As illustrated in FIG. 6, the base station 10-1 according to the first embodiment includes an antenna array 104, a radio processing unit 110, a DA/AD converting unit 120, an uplink signal detecting unit 130, a downlink signal generating unit 140, an SFN counter 152, a mapping storage unit 156, and an N-PDCCH control unit 160.

The antenna array 104 receives a radio signal from UE 20-1, acquires an electrical high frequency signal, and supplies the high frequency signal to the radio processing unit 110. The antenna array 104 transmits a radio signal to the UE 20-1 based on a high frequency signal supplied from the radio processing unit 110. The base station 10-1 can perform MIMO communication or diversity communication through the antenna array 104 including a plurality of antennas.

The radio processing unit 110 performs an analog process such as amplification, filtering, and down conversion and converts the high frequency signal supplied from the antenna array 104 into a baseband signal (uplink signal). The radio processing unit 110 converts a baseband signal (downlink signal) supplied from the DA/AD converting unit 120 into a high frequency signal.

The DA/AD converting unit 120 converts an uplink signal of an analog format supplied from the radio processing unit 110 into a signal of a digital format, and supplies the signal of the digital format to the uplink signal detecting unit 130. The DA/AD converting unit 120 converts a downlink signal of a digital format supplied from the downlink signal generating unit 140 into a signal of an analog format, and supplies the signal of the analog format to the radio processing unit 110.

The uplink signal detecting unit 130 detects a control signal such as a PUCCH or user data such as a PUSCH from an uplink signal supplied from the DA/AD converting unit 120.

The downlink signal generating unit 140 is a signal generating unit that generates a downlink signal to be transmitted from the base station 10-1. Specifically, the downlink signal generating unit 140 generates a control signal such as a PDCCH or user data such as a PDSCH. The downlink signal generating unit 140 according to the present embodiment arranges an new (N)-PDCCH in a data area of a sub frame following a periodic mapping pattern as an extension control area under control by the N-PDCCH control unit 160. The N-PDCCH may include downlink scheduling information, uplink scheduling information, MU-MIMO control information, CoMP control information, and the like. The base station 10-1 may notify the UE 20-1 of the mapping pattern of the N-PDCCH in advance by dedicated signaling.

The SFN counter 152 counts the rough SFN described above with reference to FIG. 4. The rough SFN is information which is notified to the UE 20-1 through the MIB, but the base station 10-1 also includes a counter that counts an accurate SFN of 10 bits.

The mapping storage unit 156 stores the mapping pattern for arranging the N-PDCCH for each UE 20-1. For example, the mapping pattern may be a periodic pattern which is specified by an SFN representing a reference sub frame position, a sub frame number, and a mapping period. The mapping pattern may be decided by the N-PDCCH control unit 160.

(Arrangement of N-PDCCH)

The N-PDCCH control unit 160 controls an arrangement of the N-PDCCH made by the downlink signal generating unit 140. For example, the N-PDCCH control unit 160 causes the downlink signal generating unit 140 to arrange an N-PDCCH in a data area of a sub frame following a mapping pattern with reference to the mapping storage unit 156. A concrete description will be given below with reference to FIG. 7.

Figure 7:
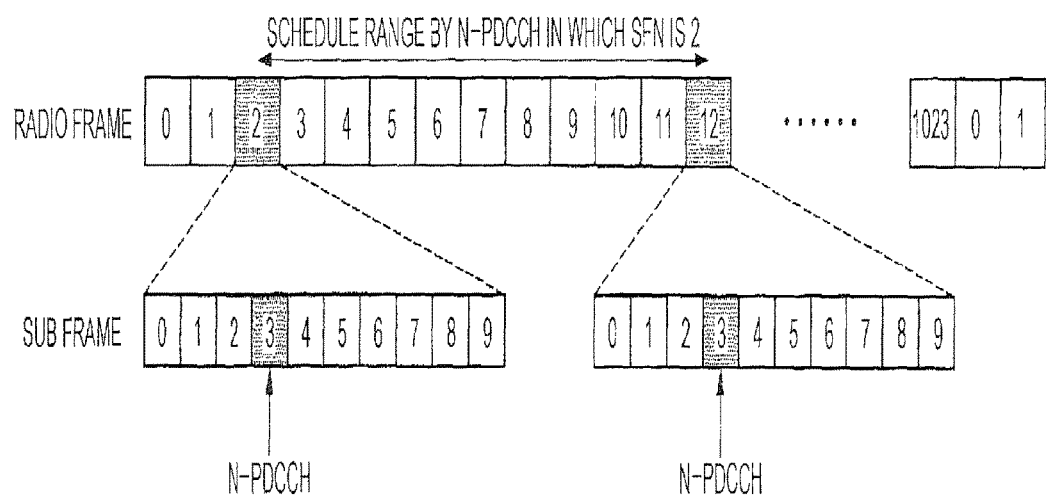
FIG. 7 is an explanatory diagram illustrating an arrangement example of an N-PDCCH.
Figure 8:
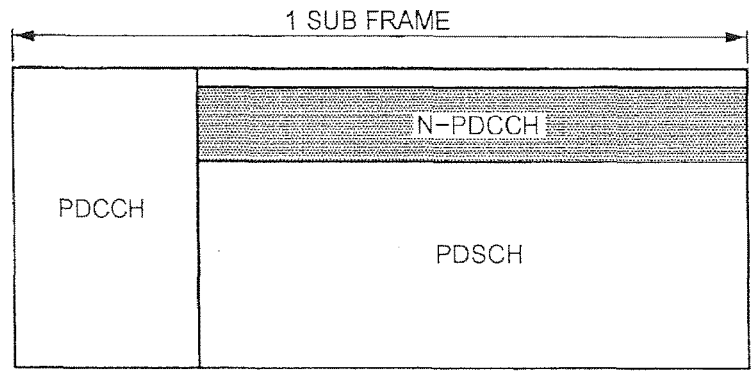
FIG. 8 is an explanatory diagram illustrating an arrangement example of an N-PDCCH.
Figure 9:
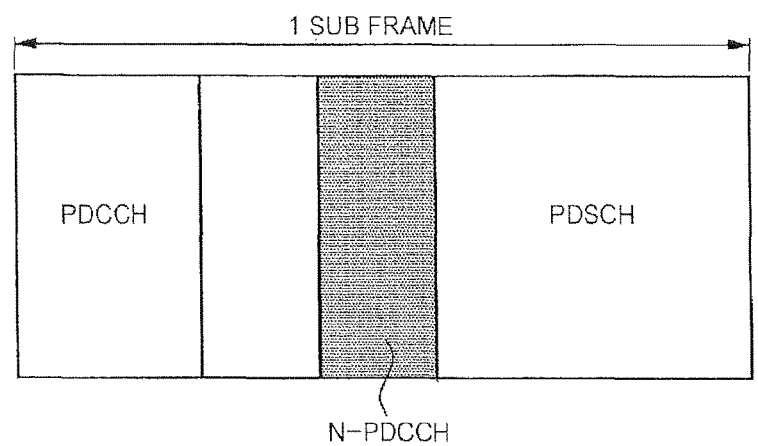
FIG. 9 is an explanatory diagram illustrating an arrangement example of an N-PDCCH.

FIG. 7 is an explanatory diagram illustrating an arrangement example of the N-PDCCH. As illustrated in FIG. 7, an N-PDCCH is arranged in a sub frame #3 of a radio frame at a period of 10 SFNs, for example, like radio frames in which SFNs are 2, 12, 22, . . . , and the like. The downlink signal generating unit 140 may arrange the N-PDCCH in some frequency bands in the data area as illustrated in FIG. 8, or may arrange the N-PDCCH in some time slots in the data area as illustrated in FIG. 9.

As described above, the N-PDCCH may include communication resource assignment information such as the downlink scheduling information and the uplink scheduling information. However, when an N-PDCCH is arranged as illustrated in FIG. 7, each N-PDCCH may include communication resource assignment information of up to a sub frame in which a next N-PDCCH is arranged. For example, when an N-PDCCH is arranged as illustrated in FIG. 7, an N-PDCCH in which an SFN is 2 may include scheduling information between a sub frame in which an SFN is 2 and a sub frame number is 4 and a sub frame in which an SFN is 12 and a sub frame number is 3.

As described above, the base station 10-1 according to the first embodiment can extend the control area while suppressing a reduction in the throughput by periodically arranging an N-PDCCH. The above-described N-PDCCH arrangement method and the N-PDCCH configuration are exemplary and can be implemented in various forms as will be described below as application examples.

First Application Example

A first application example relates to a method of designating scheduling by an N-PDCCH. The above description has been made in connection with the example in which each N-PDCCH includes scheduling information designating resource blocks between N-PDCCHs. However, when a period of an N-PDCCH increases, the number of bits of scheduling information is considered to increase in order to designate each resource block among all resource blocks present within a long period.

In this regard, a method of arranging a plurality of N-PDCCHs in a single sub frame and inserting schedule information representing an assignment of a resource block within a different range into each N-PDCCH is proposed as the first application example. A concrete description will be made below with reference to FIGS. 10 and 11.

Figure 10:
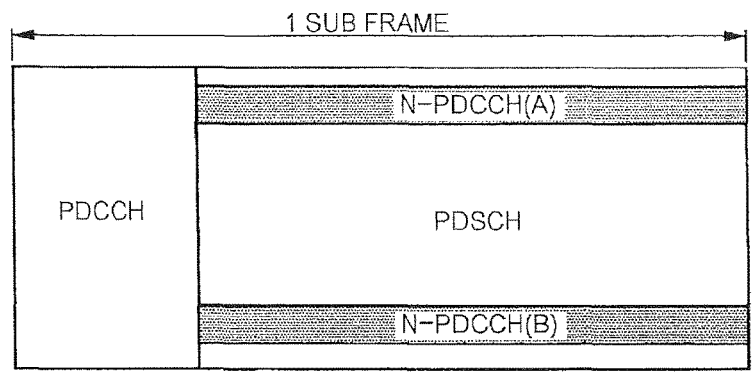
FIG. 10 is an explanatory diagram illustrating an application example of an arrangement form of an N-PDCCH.
Figure 11:
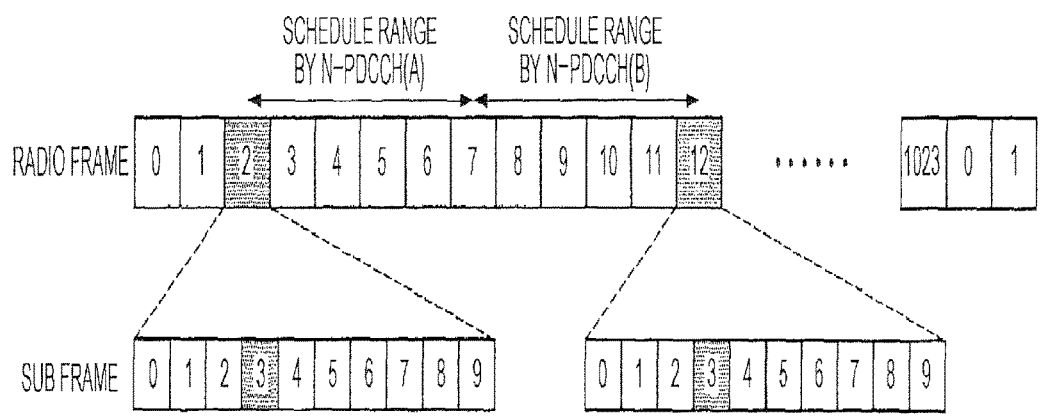
FIG. 11 is an explanatory diagram illustrating a range in which each N-PDCCH is in charge of assignment.

FIG. 10 is an explanatory diagram illustrating an application example of an arrangement form of an N-PDCCH. As illustrated in FIG. 10, the downlink signal generating unit 140 according to the first application example arranges a plurality of N-PDCCHs in different time/frequency domains of a single sub frame. Here, an N-PDCCH(A) illustrated in FIG. 10 is, for example, in charge of assigning resource blocks in the first half as illustrated in FIG. 11, and an N-PDCCH(B) is, for example, in charge of assigning resource blocks in the second half as illustrated in FIG. 11.

Through this configuration, a designation of a resource block by scheduling information included in each N-PDCCH can be performed from a resource block present within a narrower divided range, whereby the number of bits of scheduling information can be reduced. The above description has been made in connection with the example in which a plurality of N-PDCCHs are in charge of assigning different resource blocks in a time direction. However, a plurality of N-PDCCHs may be respectively in charge of assigning different resource blocks in a frequency direction.

Second Application Example

A second application example relates to a mapping pattern of an N-PDCCH. As a period of an N-PDCCH increases, a transmission/reception delay time increases. An allowable transmission/reception delay time differs according to the UE 20-1. In this regard, a method of deciding a mapping period of an N-PDCCH addressed to each UE 20-1 based on a plurality of periods is proposed as the second application example.

Figure 12:
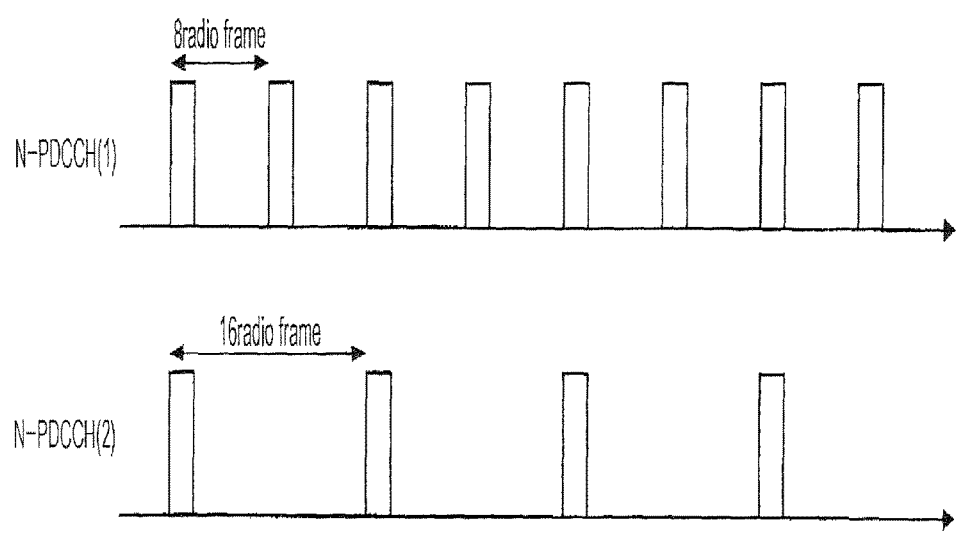
FIG. 12 is an explanatory diagram illustrating a plurality of periods of an N-PDCCH.

For example, the N-PDCCH control unit 160 has a function as a period control unit that decides a mapping period of an N-PDCCH addressed to each UE 20-1 based on a plurality of periods such as a period of 8 radio frames and a period of 16 radio frames as illustrated in FIG. 12. In further detail, the N-PDCCH control unit 160 determines a delay time allowable for transmission and reception of the UE 20-1 based on information received from the UE 20-1. When the allowable delay time is small, the N-PDCCH control unit 160 may decide the period of 8 radio frames as the mapping period of the N-PDCCH addressed to the UE 20-1. The base station 10-1 may notify the UE 20-1 of the mapping pattern having the decided mapping period in advance by dedicated signaling.

As described above, the base station 10-1 according to the second application example can decide a mapping pattern of an N-PDCCH appropriate to, for example, an application executed by the UE 20-1.

Third Application Example

A third application example relates to changing a mapping pattern of an N-PDCCH. Even though the mapping pattern appropriate to the UE 20-1 is decided in the way described in the second application example, a desirable period of the mapping pattern may change depending on a state of the UE 20-1, a change in an application, or the like. Further, when the number of UEs 20-1 belonging to an N-PDCCH following each mapping pattern is not uniform, there may occur a resource shortage in a certain N-PDCCH. In this regard, the third application example proposes changing a mapping pattern of an N-PDCCH addressed to each UE 20-1.

For example, when the number of UEs 20-1 belonging to a certain mapping pattern is larger than an upper limit number, the N-PDCCH control unit 160 may change a mapping pattern of at least one of the UEs 20-1 belonging to the mapping pattern. The N-PDCCH control unit 160 may also change the mapping pattern of the UE 20-1 according to a request from the UE 20-1. A period of a non-changed mapping pattern may be different from or identical to a period of a changed mapping pattern. Even though the periods of the mapping patterns are identical to each other, when the number of UEs 20-1 belonging to the mapping pattern is small, a transmission/reception delay time is expected to be reduced.

2-2. Configuration of UE According to First Embodiment

The configuration of the base station 10-1 according to the first embodiment has been described above. Next, a configuration of the UE 20-1 according to the first embodiment will be described.

Figure 13:
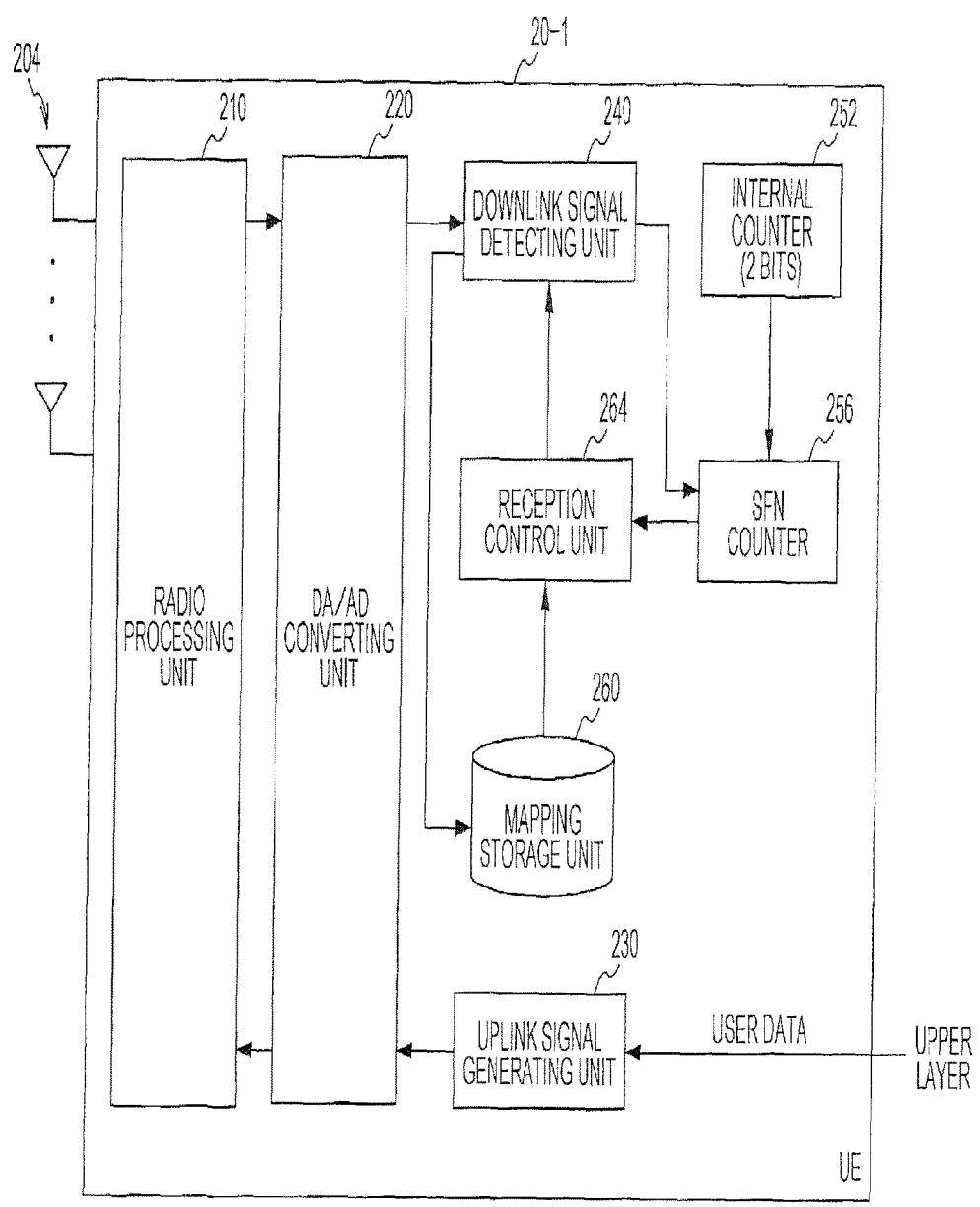
FIG. 13 is a functional block diagram illustrating a configuration of UE according to the first embodiment.

FIG. 13 is a functional block diagram illustrating a configuration of the UE 20-1 according to the first embodiment. As illustrated in FIG. 13, the UE 20-1 includes an antenna array 204, a radio processing unit 210, a DA/AD converting unit 220, an uplink signal detecting unit 230, a downlink signal detecting unit 240, an internal counter 252, an SFN counter 256, a mapping storage unit 260, and a reception control unit 264.

The antenna array 204 receives a radio signal from the base station 10-1, acquires an electrical high frequency signal, and supplies the high frequency signal to the radio processing unit 210. The antenna array 204 also transmits a radio signal to the base station 10-1 based on a high frequency signal supplied from the radio processing unit 210. The UE 20-1 can perform MIMO communication or diversity communication, since the UE 20-1 has the antenna array 204 including a plurality of antennas.

The radio processing unit 210 performs an analog process such as amplification, filtering, and down conversion, thereby converting the high frequency signal supplied from the antenna array 204 into a baseband signal (downlink signal). The radio processing unit 210 converts a baseband signal (uplink signal) supplied from the DA/AD converting unit 220 into a high frequency signal.

The DA/AD converting unit 220 converts a downlink signal of an analog format supplied from the radio processing unit 210 into a signal of a digital format, and supplies the signal of the digital format to the downlink signal detecting unit 240. The DA/AD converting unit 220 converts an uplink signal of a digital format supplied from the uplink signal generating unit 230 into a signal of an analog format, and supplies the signal of the analog format to the radio processing unit 210.

The uplink signal generating unit 230 generates an uplink signal to be transmitted to the base station 10-1. Specifically, the uplink signal generating unit 230 generates a control signal such as a PUCCH or a user data signal such as a PUSCH. As described above, the uplink signal generating unit 230 functions as a transmitting unit together with the antenna array 204, the radio processing unit 210, and the DA/AD converting unit 220.

The downlink signal detecting unit 240 detects a control signal such as a PDCCH or user data such as a PDSCH from a downlink signal supplied from the DA/AD converting unit 220. Particularly, the downlink signal detecting unit 240 according to the present embodiment detects an N-PDCCH arranged according to a periodic mapping pattern under control by the reception control unit 264. As described above, the downlink signal detecting unit 240 functions as a receiving unit together with the antenna array 204, the radio processing unit 210, and the DA/AD converting unit 220.

The internal counter 252 counts 10 ms which is a period of a radio frame as 2 bits as described above with reference to FIG. 4.

The SFN counter 256 is a counting unit that counts an SFN based on a rough SFN included in an MIB detected by the downlink signal detecting unit 240 and a count value obtained by the internal counter 252.

The mapping storage unit 260 stores a mapping pattern of an N-PDCCH. As described above, for example, the mapping pattern may be a periodic pattern which is specified by an SFN representing a reference sub frame position, a sub frame number, and a mapping period. For example, the mapping pattern is notified from the base station 10-1 to the UE 20-1 in advance by dedicated signaling.

The reception control unit 264 controls reception by the receiving unit including the downlink signal detecting unit 240 according to an SFN counted by the SFN counter 256. For example, the reception control unit 264 may determine whether or not a sub frame following a mapping pattern stored in the mapping storage unit 260 has arrived, and then cause the receiving unit to perform a reception process in the sub frame following the mapping pattern. Through this configuration, the UE 20-1 can receive an N-PDCCH transmitted from the base station 10-1 in the sub frame following the mapping pattern.

2-3. Operation According to First Embodiment

The configurations of the base station 10-1 and the UE 20-1 according to the first embodiment have been described above. Next, operations of the base station 10-1 and the UE 20-1 will be described with reference to FIGS. 14 and 15.

Figure 14:
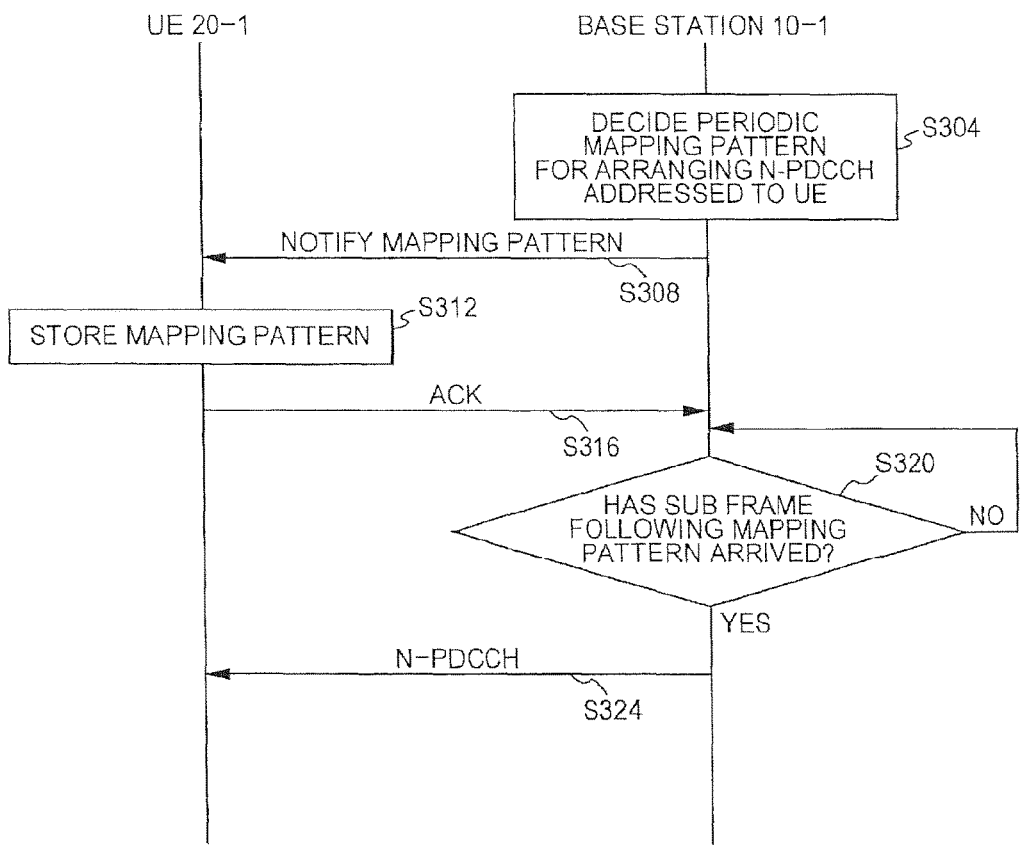
FIG. 14 is a sequence diagram illustrating operations of a base station and UE according to the first embodiment.

FIG. 14 is a sequence diagram illustrating operations of the base station 10-1 and the UE 20-1 according to the first embodiment. As illustrated in FIG. 14, first, when the N-PDCCH control unit 160 of the base station 10-1 decides a periodic mapping pattern for arranging an N-PDCCH addressed to the UE 20-1 (S304), the base station 10-1 notifies the UE 20-1 of the decided mapping pattern (S308).

Then, the UE 20-1 stores the mapping pattern notified from the base station 10-1 in the mapping storage unit 260 (S312), and transmits ACK representing a reception acknowledgement of the mapping pattern to the base station 10-1 (S316).

Thereafter, the N-PDCCH control unit 160 of the base station 10-1 determines whether or not a sub frame following a mapping pattern has arrived (S320). When the sub frame has arrived, the downlink signal generating unit 140 arranges an N-PDCCH in a data area of the sub frame. Then, the base station 10-1 transmits the N-PDCCH arranged in the sub frame to the UE 20-1 (S324).

The mapping pattern can be changed as described above in the third application example. An operation example of changing the mapping pattern will be described with reference to FIG. 15.

Figure 15:
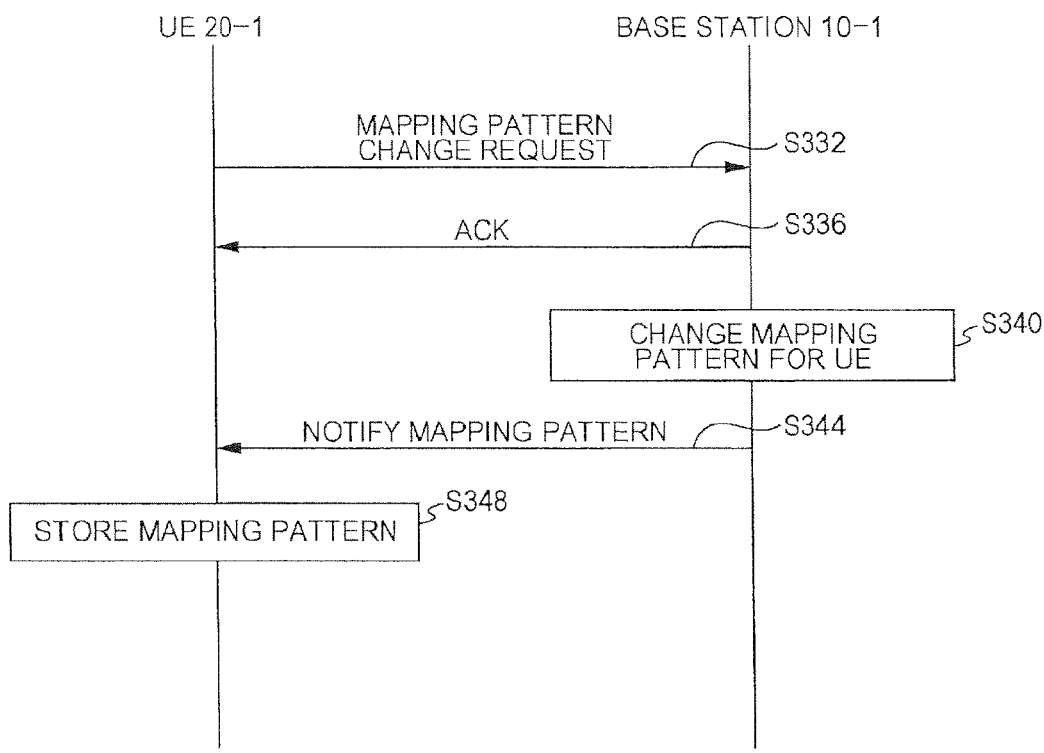
FIG. 15 is a sequence diagram illustrating an operation example of changing a mapping pattern.

FIG. 15 is a sequence diagram illustrating an operation example of changing a mapping pattern. As illustrated in FIG. 15, first, when the UE 20-1 requests the base station 10-1 to change a mapping pattern (S332), the base station 10-1 transmits ACK to the UE 20-1 as a reception acknowledgement (S336). Then, the N-PDCCH control unit 160 of the base station 10-1 changes the mapping pattern for the UE 20-1 (S340).

Thereafter, the base station 10-1 notifies the UE 20-1 of the changed mapping pattern (S344). The UE 20-1 stores the changed mapping pattern notified from the base station 10-1 in the mapping storage unit 260 (S348). In FIG. 15, the example in which the UE 20-1 requests a change of a mapping pattern has been described, but the base station 10-1 may request a change of a mapping pattern. In addition, the above description has been made in connection with the example in which the base station 10-1 decides a mapping pattern, but the UE 20-1 may decide a mapping pattern and notify the base station 10-1 of the decided mapping pattern.

According to the first embodiment of the present disclosure, the base station 10-1 periodically arranges N-PDCCHs as described above. Thus, a reduction in the throughput can be suppressed, and the control area can be extended. Accordingly, the base station 10-1 can accommodate many UEs 20-1 (including an MTC terminal).

3. Second Embodiment

Next, a second embodiment of the present disclosure will be described. According to the second embodiment of the present disclosure, it is possible to increase a period recognizable by the UE 20-2. Thus, for example, it is possible to increase a mapping period of an N-PDCCH described in the first embodiment.

Point of View of Second Embodiment

Figure 16:
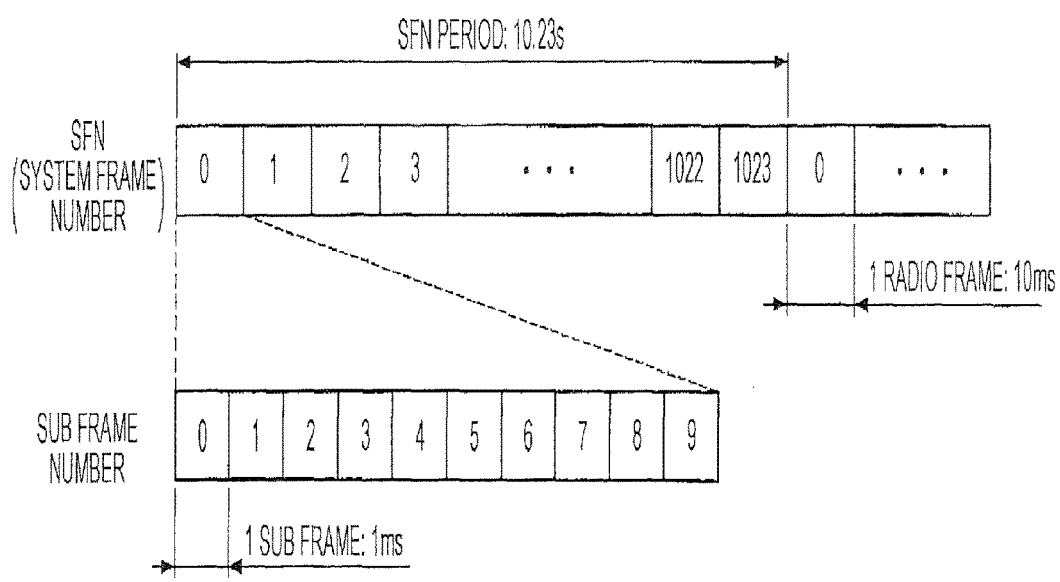
FIG. 16 is an explanatory diagram illustrating an SFN period.

FIG. 16 is an explanatory diagram illustrating an SFN period. As illustrated in FIG. 16, any one of SFNs of 0 to 1023 is assigned to each radio frame of 10 ms. In other words, the same SFN is assigned at intervals of 1024 radio frames. Based on the SFN, the UE can recognize a time of up to next 10.23 seconds (10 ms×1024), which is an SFN period. For example, when a current SFN is 3, a time after 4 seconds can be recognized as a radio frame in which an SFN is 403. However, since there is no technique of distinguishing each period of an SFN (10.23), it is difficult for the UE to recognize a time after 10.23 seconds.

Outline of Second Embodiment

Figure 17:
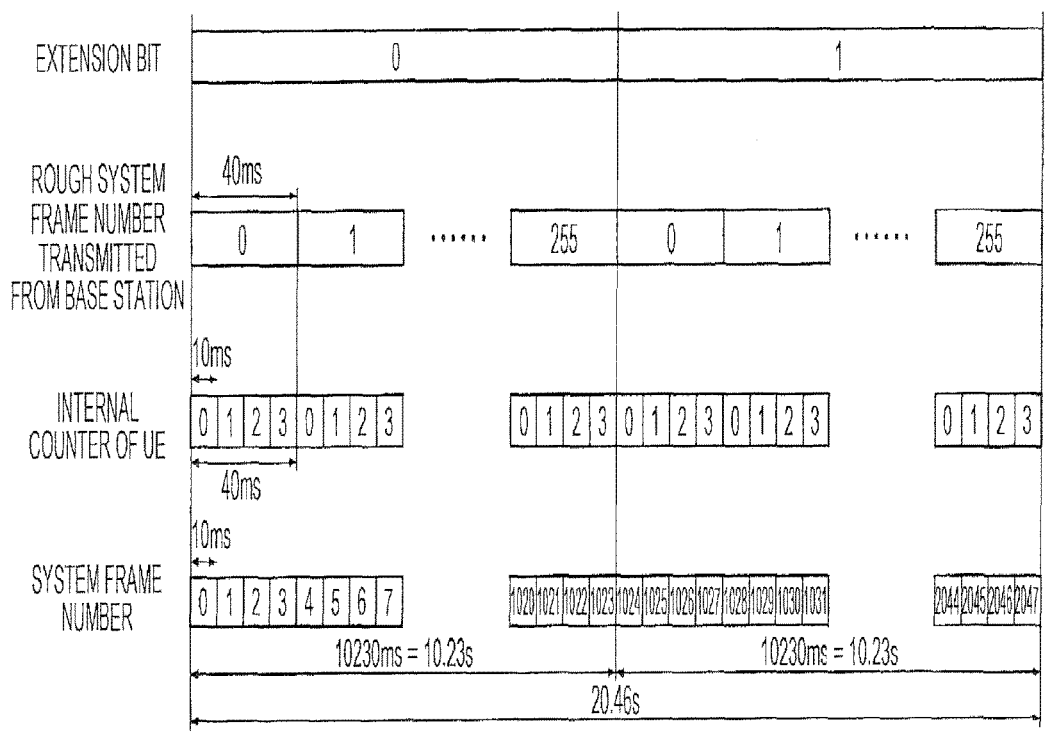
FIG. 17 is an explanatory diagram illustrating an outline of a second embodiment.

In this regard, in the second embodiment, a technique that sets an extension bit for identifying each period of an SFN is proposed. For example, as illustrated in FIG. 17, the base station 10-2 according to the second embodiment sets an extension bit of 1 bit for identifying an SFN period, and then transmits the extension bit through a PBCH. Through this configuration, an SFN is extended to a range of 0 to 2047, and thus the UE 20-2 according to the second embodiment can recognize a time of up to next 20.47 seconds. A time recognizable by the UE 20-2 can be further increased by increasing the number of bits of the extension bit. A configuration of the base station 10-2 for implementing the second embodiment will be described below.

3-1. Configuration of Base Station According to Second Embodiment

Figure 18:
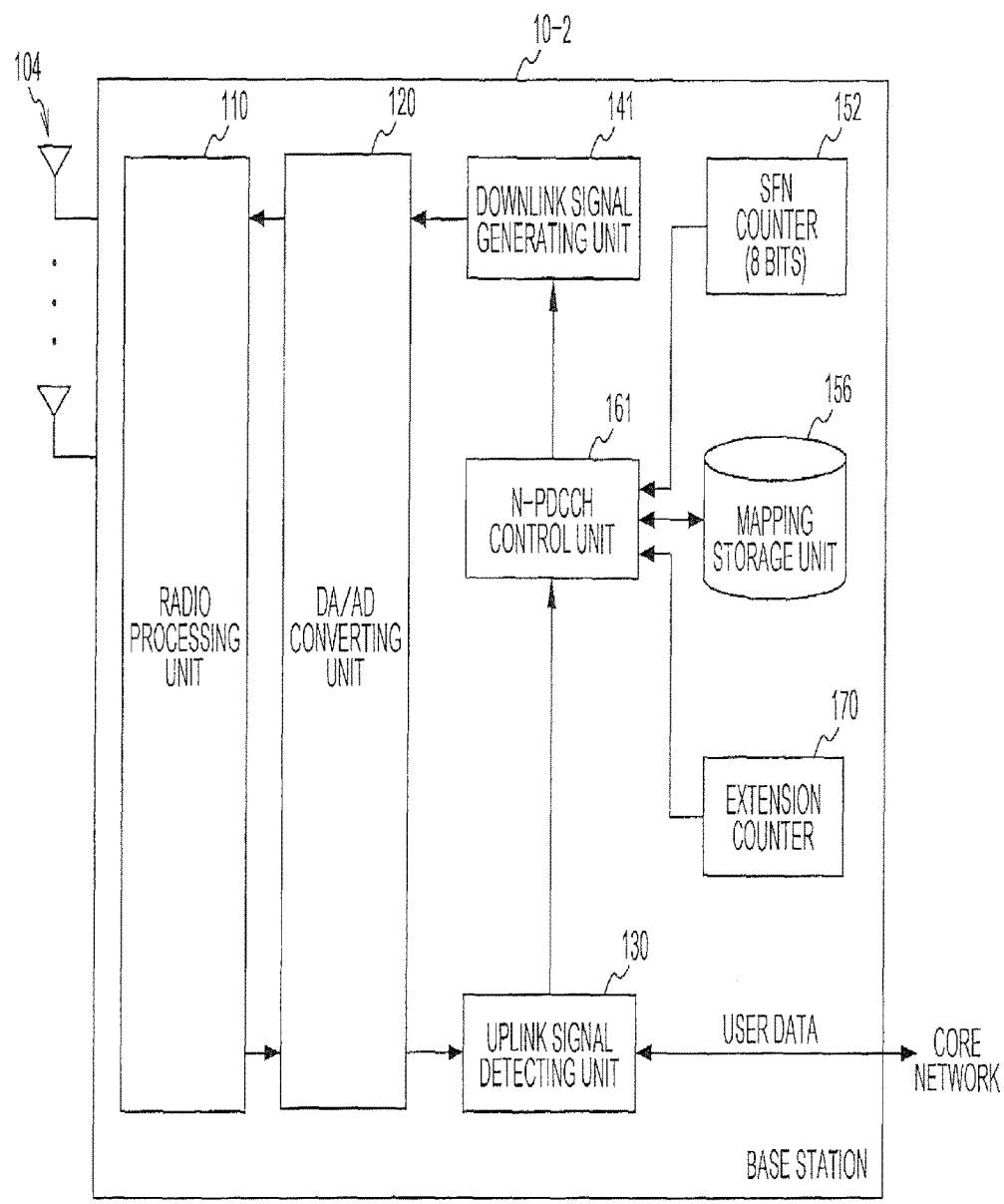
FIG. 18 is a functional block diagram illustrating a configuration of a base station according to the second embodiment.

FIG. 18 is a functional block diagram illustrating a configuration of the base station 10-2 according to the second embodiment. As illustrated in FIG. 18, the base station 10-2 according to the second embodiment includes an antenna array 104, a radio processing unit 110, a DA/AD converting unit 120, an uplink signal detecting unit 130, a downlink signal generating unit 141, an SFN counter 152, a mapping storage unit 156, an N-PDCCH control unit 161, and an extension counter 170. The antenna array 104, the radio processing unit 110, the DA/AD converting unit 120, the uplink signal detecting unit 130, the SFN counter 152, and the mapping storage unit 156 are the same as those in the first embodiment, and a detailed description thereof will not be repeated. In the following, one SFN period is defined as a super system frame.

The extension counter 170 counts a lapse of 10.23 seconds which is an SFN period. A super system frame is identified by an extension bit obtained as a counting result of the extension counter 170. For this reason, although the number of bits of the extension bit is not particularly limited, as the number of bits increases, more super system frames can be identified.

The downlink signal generating unit 141 generates system information including an extension bit counted by the extension counter 170. The extension bit may be included in the same MIB as the rough SFN or may be included in any logical block such as the SIB different from the rough SFN.

The downlink signal generating unit 141 generates information representing a mapping pattern of UE 20-2. According to the second embodiment, even when a mapping period is longer than an SFN period, the mapping period can be represented using the extension bit.

The N-PDCCH control unit 161 controls an arrangement of an N-PDCCH by the downlink signal generating unit 141 similarly to the first embodiment. For example, the N-PDCCH control unit 160 causes the downlink signal generating unit 141 to arrange an N-PDCCH in a data area of a sub frame following a mapping pattern with reference to the mapping storage unit 156.

In the second embodiment, since an extension bit for identifying each SFN period is employed, the N-PDCCH control unit 161 can control an arrangement of an N-PDCCH following a mapping pattern with a mapping period longer than 10.23 seconds which is a super system frame period.

As described above, since the base station 10-2 according to the second embodiment transmits the extension bit for identifying the super system frame, for example, through a PBCH, the UE 20-2 can identify the super system frame based on the extension bit. In other words, the UE 20-2 according to the second embodiment can recognize a time after 10.23 seconds which is the super system frame period.

3-2. Modified Embodiment of Second Embodiment

The above description has been made in connection with the example in which the base station 10-2 transmits the extension bit. However, according to the following modified embodiment, an extension counter is disposed at a UE side, and thus an equivalent effect as in the above-described second embodiment can be obtained even though the base station 10-2 does not transmit the extension bit.

Figure 19:
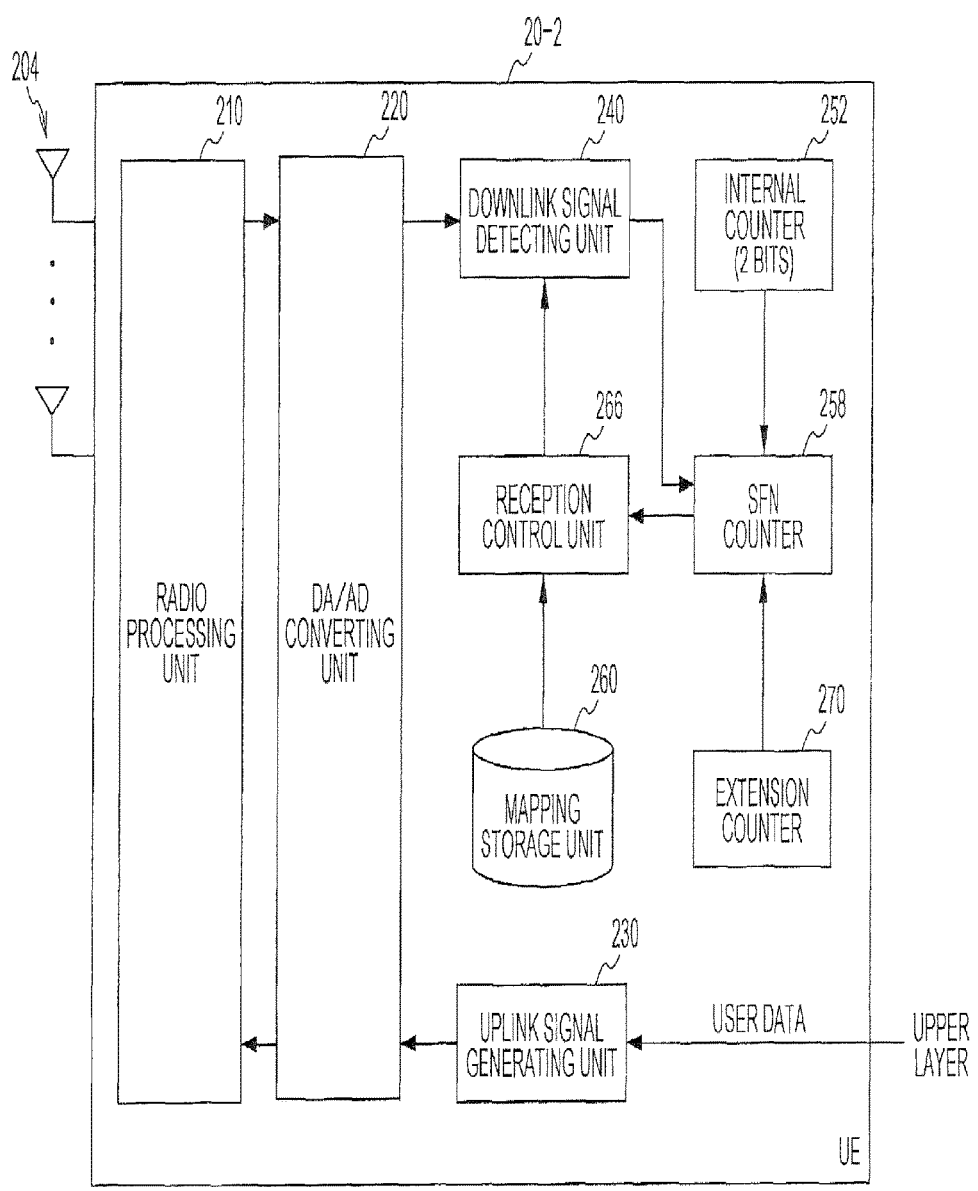
FIG. 19 is a functional block diagram illustrating a configuration of UE according to a modified embodiment of the second embodiment.

FIG. 19 is a functional block diagram illustrating a configuration of UE 20-2 according to the modified embodiment of the second embodiment. As illustrated in FIG. 19, the UE 20-2 according to the modified embodiment includes an antenna array 204, a radio processing unit 210, a DA/AD converting unit 220, an uplink signal detecting unit 230, a downlink signal detecting unit 240, an internal counter 252, an SFN counter 258, a mapping storage unit 260, a reception control unit 266, and an extension counter 270. The antenna array 204, the radio processing unit 210, the DA/AD converting unit 220, the uplink signal detecting unit 230, the downlink signal detecting unit 240, and the internal counter 252 are the same as in the first embodiment, and thus a detailed description thereof will not be repeated.

The extension counter 270 counts a lapse of 10.23 seconds which is an SFN period. A super system frame is identified by an extension bit obtained as a counting result of the extension counter 270. For this reason, although the number of bits of the extension bit is not particularly limited, as the number of bits increases, more super system frames can be identified. A point to start a count of a super system frame may be decided in advance by signaling with the base station 10-2.

The SFN counter 258 counts an SFN based on a rough SFN included in an MIB detected by the downlink signal detecting unit 240, a bit value counted by the internal counter 252, and an extension bit value counted by the extension counter 270. For example, when the extension bit is "1," the rough SFN is "255," and the count value obtained by the internal counter 252 is "2,", "2046" is obtained as an SFN count value by the SFN counter 258 as illustrated in FIG. 17. As described above, the SFN counter 258 according to the second embodiment functions as a counting unit for counting an SFN together with the internal counter 252 and the extension counter 270.

The reception control unit 266 controls reception by the receiving unit including the downlink signal detecting unit 240 according to an SFN counted by the SFN counter 256.

For example, the reception control unit 264 may determine whether or not a sub frame following a mapping pattern stored in the mapping storage unit 260 has arrived, and then cause the receiving unit to perform a reception process in the sub frame following the mapping pattern.

Here, according to the present modified embodiment, the super system frame is identified based on the extension bit through the SFN counter 258. Thus, even when the mapping period of the N-PDCCH is longer than 10.23 seconds which is a super system frame length, the reception control unit 266 can appropriately control reception of an N-PDCCH through the receiving unit including the downlink signal detecting unit 240. Further, according to the present modified embodiment, there is a merit that the base station 10-2 side may not transmit the extension bit through a PBCH.

4. Third Embodiment

Point of View of Third Embodiment

The UE 20-2 according to the modified embodiment of the second embodiment can count many super system frames using the extension counter 270 as described above. For this reason, the UE 20-2 according to the modified embodiment of the second embodiment can remain in a sleep state for a long time and then return from the sleep state when the counting result reaches a target frame (for example, a sub frame in which an N-PDCCH is arranged).

However, an obtained counting result may be inaccurate depending on the accuracy of an oscillator such as the internal counter 252. For example, when the accuracy of an oscillator is 1 ppm, an error of 0.6048 seconds may occur in 7 days as expressed in the following Formula:

$$\text{Estimated possible error} = 7 \text{ days} \times 24 \text{ hours} \times$$
$$3600 \text{ seconds} \times 1/1000000$$
$$= 0.6048 \text{ seconds}$$

The 0.6048 seconds are equal to a time length of about 60 radio frames. In other words, in the case in which the mapping period of the N-PDCCH is 7 days, even though the UE transitions to the sleep state and then returns from the sleep state when the counting result reaches the target frame, there may be expected that transmission of an N-PDCCH from the base station 10 has ended before 60 radio frames.

A third embodiment of the present disclosure has been made in light of the foregoing. According to the third embodiment of the present disclosure, a signal transmitted through a target frame can be more reliably received even when the sleep state lasts for a long period of time. A configuration and an operation of an UE 20-3 according to the third embodiment will be described below in detail.

Figure 20:
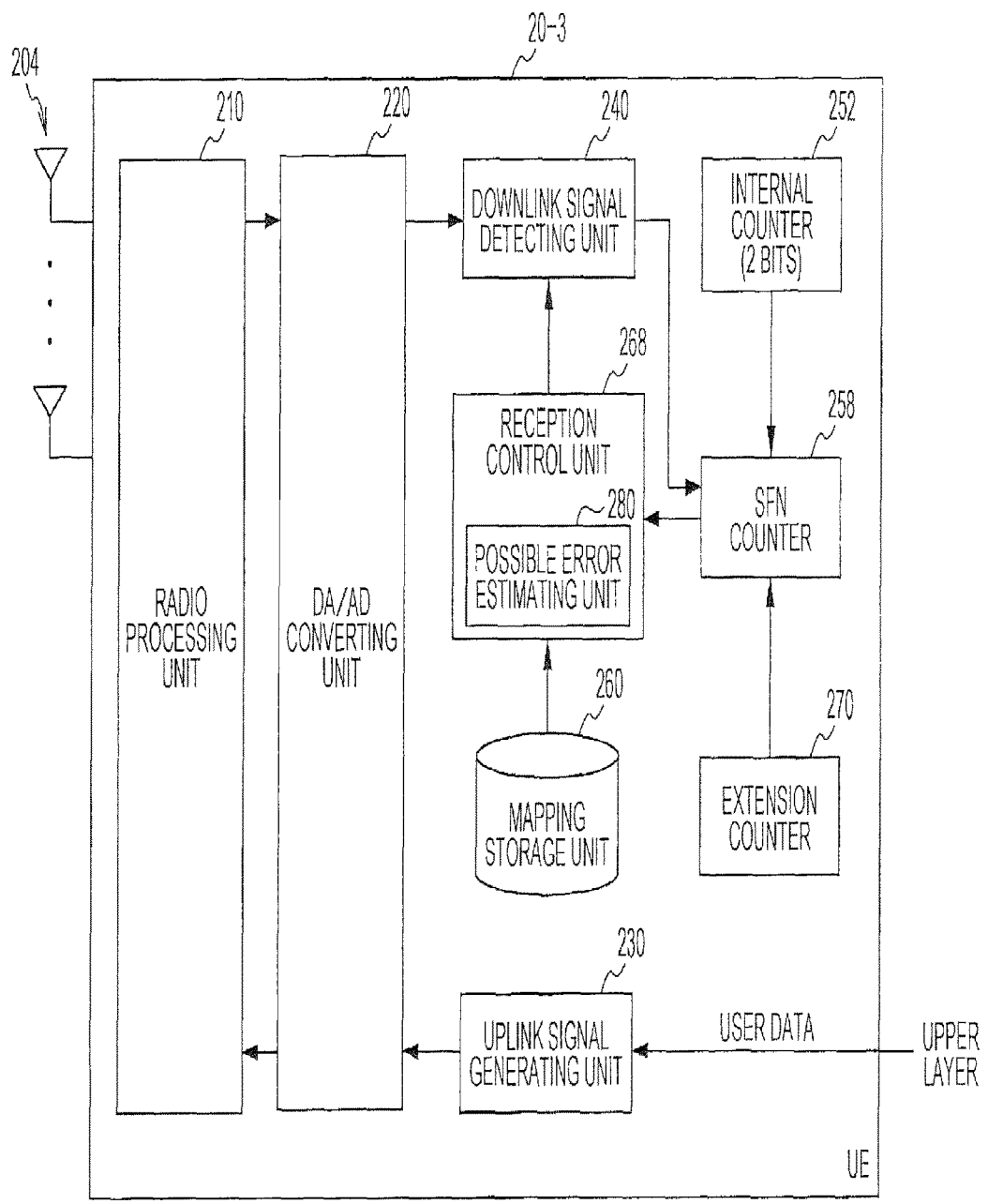
FIG. 20 is a functional block diagram illustrating a configuration of UE according to a third embodiment.

FIG. 20 is a functional block diagram illustrating a configuration of the UE 20-3 according to the third embodiment. As illustrated in FIG. 20, the UE 20-3 according to the third embodiment includes an antenna array 204, a radio processing unit 210, a DA/AD converting unit 220, an uplink signal detecting unit 230, a downlink signal detecting unit 240, an internal counter 252, an SFN counter 258, a mapping storage unit 260, a reception control unit 268, and an extension counter 270. The antenna array 204, the radio processing unit 210, the DA/AD converting unit 220, the uplink signal detecting unit 230, the downlink signal detecting unit 240, the internal counter 252, the extension counter 270, and the like are the same as in the second embodiment, and thus a detailed description thereof will not be repeated.

The reception control unit 268 performs control such that the receiving unit including the downlink signal detecting unit 240 transitions to a sleep state or returns to a reception state from the sleep state. Here, when the receiving unit is in the sleep state, the SFN is counted based on the counting results of the internal counter 252 and the extension counter 270, but an error may occur depending on the accuracy of an oscillator such as the internal counter 252. For this reason, the reception control unit 268 according to the third embodiment has a function of a possible error estimating unit 280 that estimates a count error occurring during the sleep state.

Specifically, the possible error estimating unit 280 estimates a possible error based on the length of the sleep state and the accuracy of an oscillator. For example, when the length of the sleep state is 7 days and the accuracy of an oscillator is 1 ppm, the possible error estimating unit 280 estimates that a possible error is about 0.6048 seconds as expressed in the above formula. The 0.6048 seconds are equal to a time length of about 60 radio frames.

The reception control unit 268 causes the receiving unit to return from the sleep state based on the possible error estimated by the possible error estimating unit 280 before the counting result by the SFN counter 258 reaches the target frame. Here, a positional difference between a radio frame, in which the reception control unit 268 causes the receiving unit to return from the sleep state, and the target frame may be larger than radio frames whose number corresponds to the possible error estimated by the possible error estimating unit 280.

Further, the reception control unit 268 detects an accurate current SFN from a reception result of the returned receiving unit, and causes the receiving unit to transition to the sleep state again over a time period corresponding to the difference between the accurate current SFN and the SFN of the target frame. According to this configuration, since it is unnecessary to continuously cause the receiving unit to remain in the reception state until the target frame after first return, power consumption of UE 20-3 can be reduced. This sleep control will be more concretely described below with reference to FIG. 21.

Figure 21:
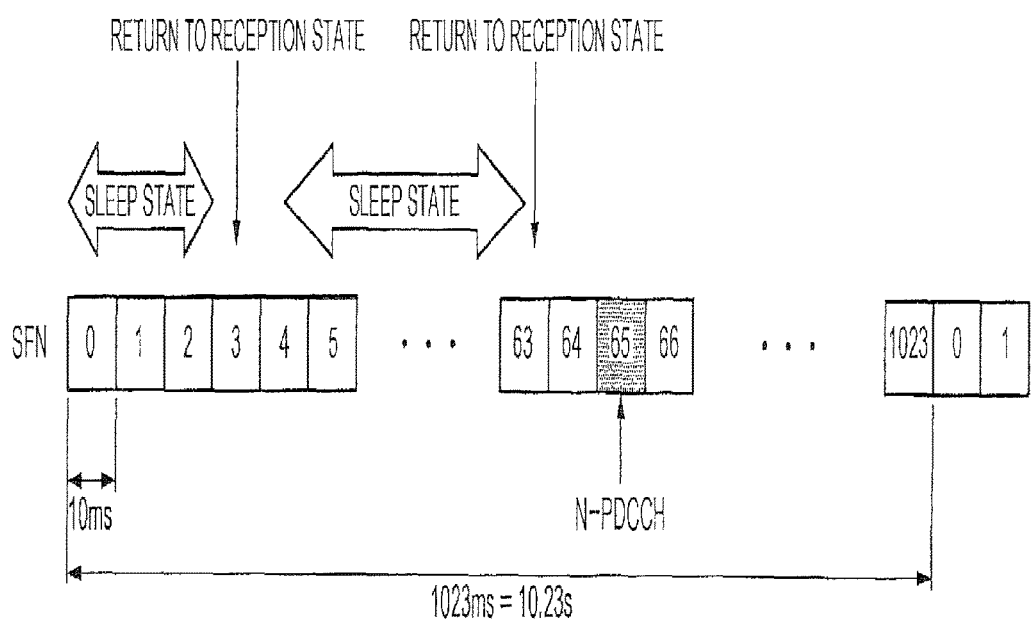
FIG. 21 is an explanatory diagram illustrating a concrete example of sleep control according to the third embodiment.

FIG. 21 is an explanatory diagram illustrating a concrete example of the sleep control according to the third embodiment. More specifically, FIG. 21 illustrates a concrete example of the sleep control when an SFN of a radio frame in which an N-PDCCH is arranged is "65" and a possible error of about 0.6048 seconds is estimated by the possible error estimating unit 280.

In this case, the reception control unit 268 causes the receiving unit to return from the sleep state before about 60 radio frames (for example, SFN=3) from a target frame (SFN=65) as illustrated in FIG. 21. Then, the reception control unit 268 detects an accurate current SFN, and causes the receiving unit to transition to the sleep state again over about 60 radio frames which is a difference with the target frame. Thereafter, the reception control unit 268 causes the receiving unit to return from the sleep state before the target frame (for example SFN=63). Through this configuration, an N-PDCCH can be received through the target frame. Further, by causing the receiving unit to transition to the sleep state again, power necessary to receive about 60 radio frames can be reduced.

First Application Example

Figure 22:
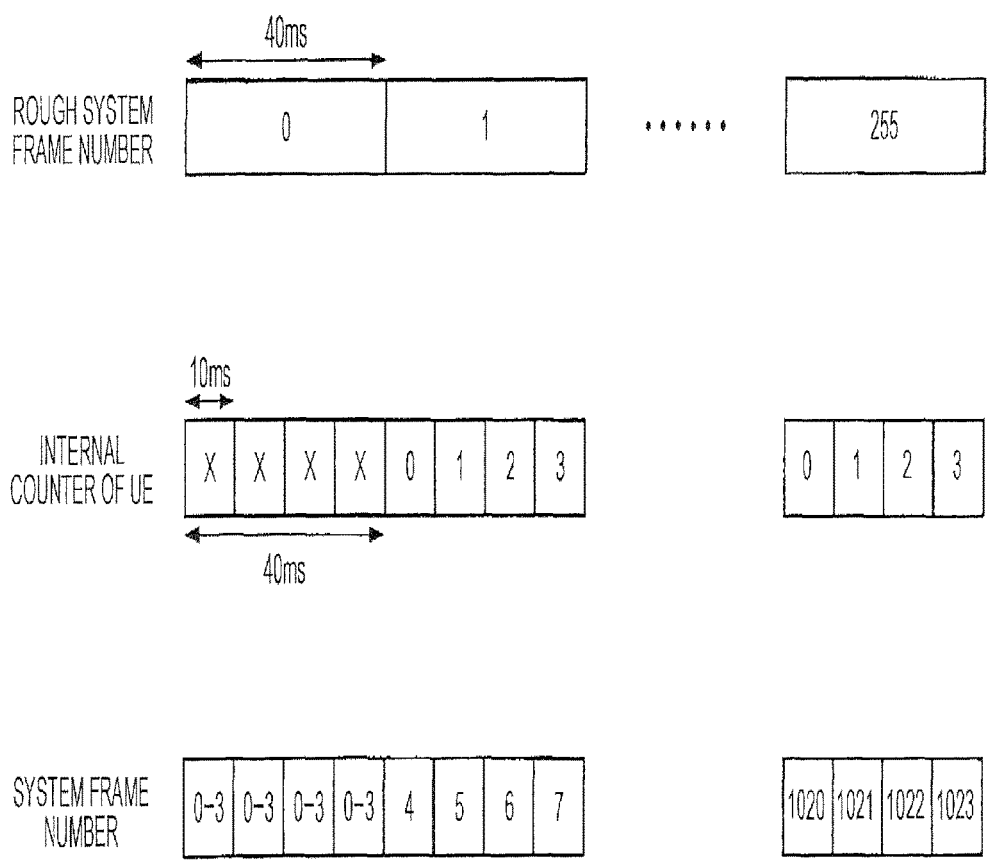
FIG. 22 is an explanatory diagram illustrating a method of specifying an SFN.

As described above, the rough SFN transmitted from the base station 10 is information of 8 bits updated at a period of 40 ms. A complete SFN is expected to be obtained in a manner that the internal counter 252 counts a lapse of 10 ms from a time point when the rough SFN is updated. In this case, before an update of the rough SFN is detected, it is difficult to specify an accurate SFN even though it is possible to make a rough detection of the SFN. For example, as illustrated in FIG. 22, even though a rough SFN "0" included in an MIB is detected, if an update of the rough SFN to "0" is not detected, it is difficult for the SFN counter 258 to specify an accurate SFN even though it is possible for the SFN counter 258 to know that an SFN is in a range of "0" to "3."

Thus, the reception control unit 268 may cause the receiving unit to transition to the sleep state again after an update of the rough SFN is detected when a first return from the sleep state has been made. Through this configuration, the SFN counter 258 can specify an accurate current SFN.

Second Application Example

However, it may take 40 ms to detect an update of the rough SFN. When the receiving unit remains in the reception state during the time period, power consumption increases. In this regard, as an alternative, the reception control unit 268 may cause the receiving unit to transition to the sleep state again before the update of the rough SFN is detected when the first return from the sleep state has been made. In this case, since it is possible to make a rough detection of the current SFN, the reception control unit 268 can control a second sleep time based on the roughly detected current SFN.

Third Application Example

In addition, in the second application example, power consumption can be further reduced by devising a relation between a first return frame and a second return frame. This point will be concretely described with reference to FIG. 23.

Figure 23:
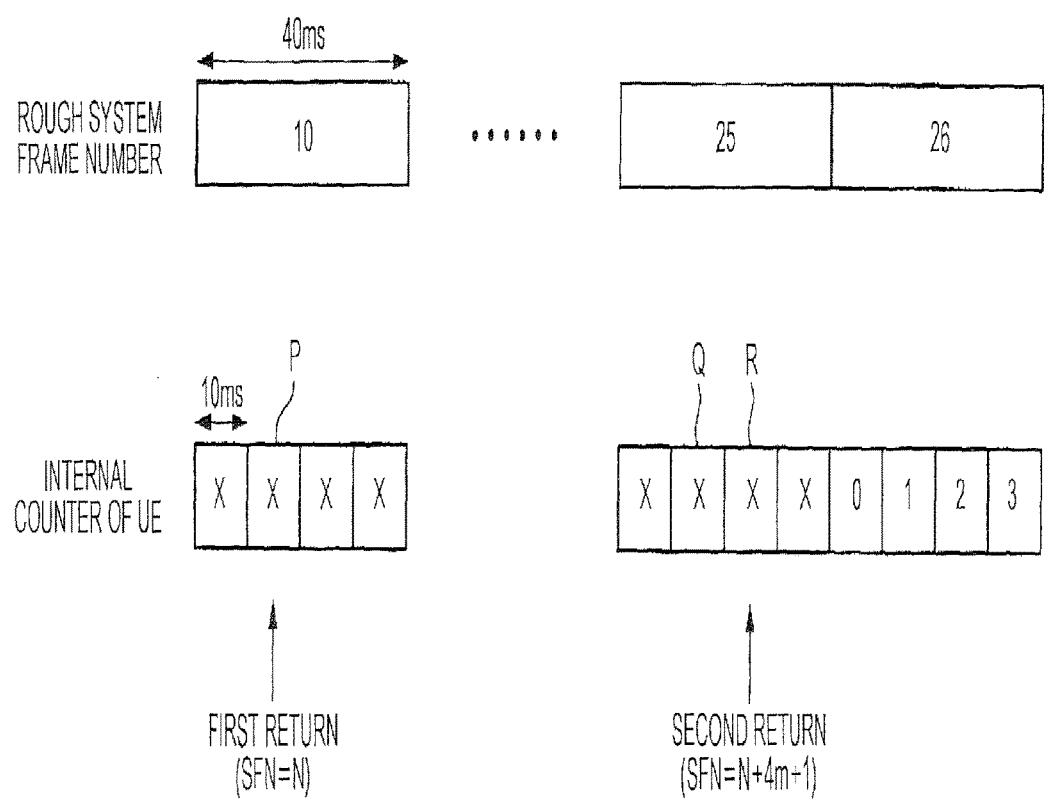
FIG. 23 is an explanatory diagram illustrating an application example of the third embodiment.

FIG. 23 is an explanatory diagram illustrating an application example of the third embodiment. Let us consider a case in which the reception control unit 268 controls the first return of the receiving unit from the sleep state in a radio frame P and then causes the receiving unit to transition to the sleep state again before an update of the rough SFN is detected as illustrated in FIG. 23. In this case, an accurate SFN of the radio frame P is unclear, but it is possible to specify a difference between an SFN of the radio frame P and an SFN of another radio frame.

For example, when an SFN of the radio frame P is "N," an SFN of a radio frame Q illustrated in FIG. 23 is represented by "N+4m," and an SFN of a radio frame Q is represented by "N+4m+1 (m is a positive integer)."

Here, when the update of the rough SFN has not been detected in the radio frame P in which the receiving unit has made the first return, the update of the rough SFN is not detected even in the radio frame Q in which the SFN is represented by "N+4m." Thus, the reception control unit 268 may perform control such that the receiving unit makes the second return in a radio frame (for example, the radio frame R) in which the SFN is not represented by "N+4m" but by, for example, "N+4m+1". Through this configuration, it is possible to reduce a time until the update of the rough SFN is detected after the second return.

4-2. Operation According to Third Embodiment

The configuration of the UE 20-3 according to the third embodiment of the present disclosure has been described above. Next, an operation according to the third embodiment will be described with reference to FIG. 24.

Figure 24:
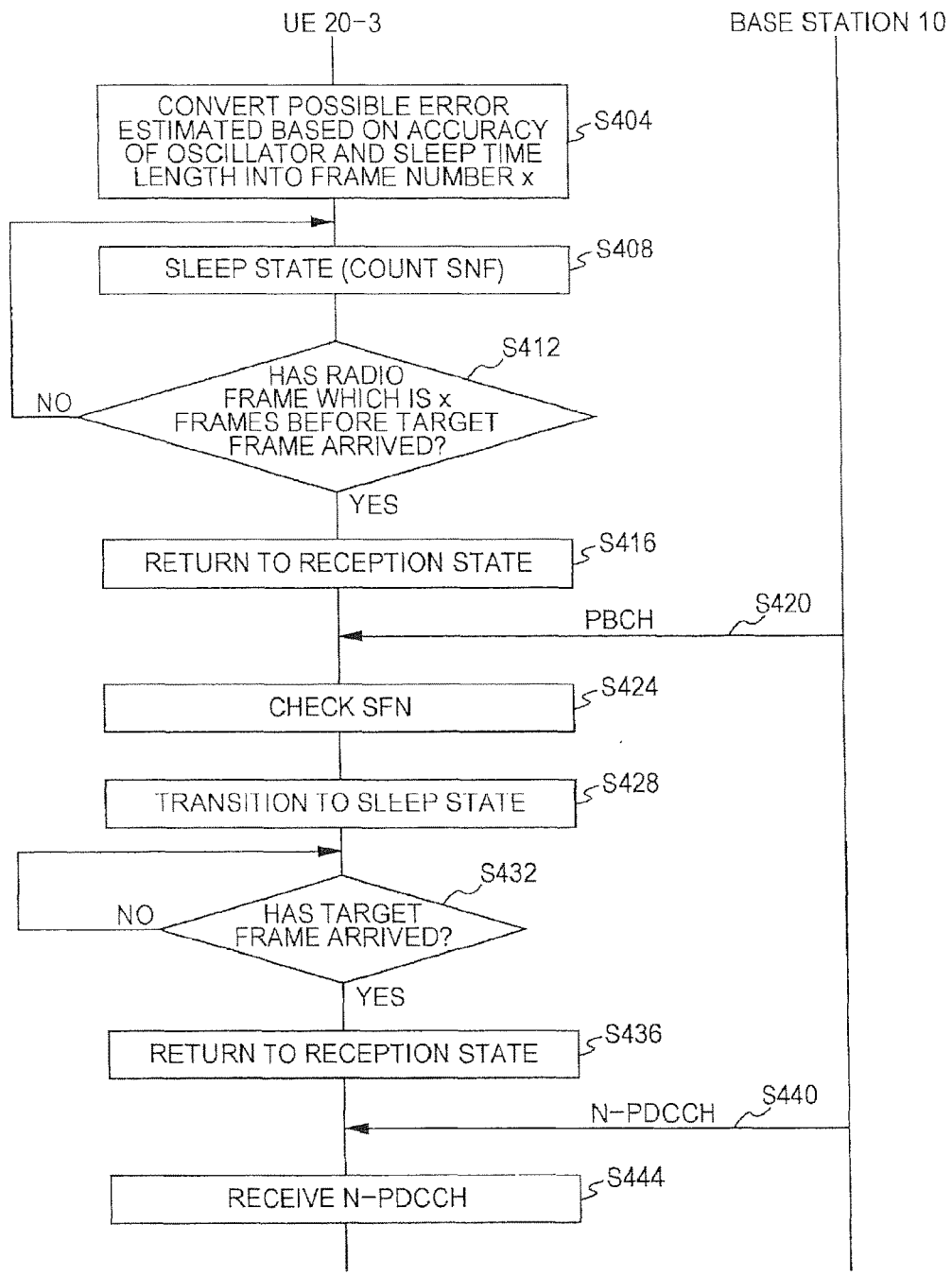
FIG. 24 is a sequence diagram illustrating, in an organized manner, an operation according to the third embodiment.

FIG. 24 is a sequence diagram illustrating, in an organized manner, an operation according to the third embodiment. As illustrated in FIG. 24, first, the possible error estimating unit 280 of the UE 20-3 estimates a possible error based on the accuracy of an oscillator and a sleep time length, and converts the possible error into a radio frame number x (S404). Then, the reception control unit 268 causes the receiving unit including the downlink signal detecting unit 240 to transition to the sleep state (S408). During that time, the SFN counter 258 continuously counts an SFN using a count value by the internal counter 252.

Then, when the SFN counting result has reached a radio frame before x frames from a target frame (S412), the reception control unit 268 causes the receiving unit to return to the reception state from the sleep state (S416). Thereafter, the SFN counter 258 checks a current SFN based on a rough SFN included in a PBCH received from the base station 10 (S420 and S424). Then, the reception control unit 268 causes the receiving unit to transition to the sleep state again over a time period corresponding to a difference between the current SFN and the target frame (S428).

Thereafter, the reception control unit 268 causes the receiving unit to return to the reception state from the sleep state before the SFN counting result reaches the target frame (S436). As a result, the UE 20-3 can receive an N-PDCCH transmitted through the target frame from the base station 10 (S440 and S444).

4-3. Modified Embodiment

The above description has been made in connection with the example in which sleep control is performed in terms of an error of an oscillator of the UE 20-3. However, the error of an oscillator may be larger than a super system frame including a single SFN period (1023 radio frames). For example, when the accuracy of an oscillator of the UE 20-3 is 4 ppm and the sleep time length is 30 days, an error of 10.368 seconds may occur as expressed in the following formula. The 10.368 seconds are larger than 10.24 seconds which are a super system frame length corresponding to a length of 1037 radio frames.

$$\text{Estimated possible error} = 30 \text{ days} \times 24 \text{ hours} \times$$
$$3600 \text{ seconds} \times 4/1000000$$
$$= 10.368 \text{ seconds}$$

Thus, when the base station 10 does not transmit the extension bit for identifying the super system frame and the UE 20-3 counts the extension bit instead, the UE 20-3 may erroneously recognize a current super system frame.

In this regard, a method of causing the UE 20-3 to receive a desired signal even when a possible error in the sleep state is larger than a single super system frame will be described below as a modified embodiment of the third embodiment.

First Modified Embodiment

A base station 10 according to a first modified embodiment of the third embodiment arranges an N-PDCCH not only in a sub frame of a radio frame following a mapping pattern but also in sub frames of radio frames of previous and next super system frames having the same SFN as the corresponding radio frame. A concrete description will be made below with reference to FIG. 25.

Figure 25:
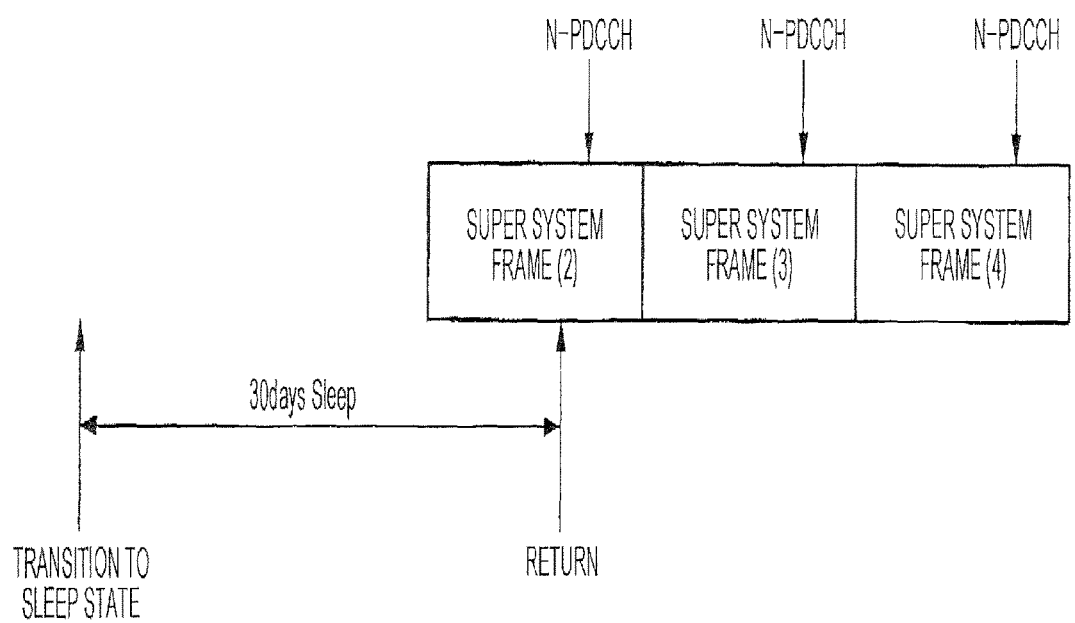
FIG. 25 is an explanatory diagram illustrating a first modified embodiment of the third embodiment.

FIG. 25 is an explanatory diagram illustrating the first modified embodiment of the third embodiment. As illustrated in FIG. 25, the base station 10 according to the first modified embodiment transmits an N-PDCCH not only through a super system frame (3) following a mapping pattern but also through the same sub frames among radio frames of previous and next super system frame (2) and (4) having the same SFN. Through this configuration, even though the UE 20-3 has erroneously recognized one super system frame, the UE 20-3 can receive an N-PDCCH through super system frames before and after a correct super system frame.

Further, when the UE 20-3 has received an N-PDCCH through a certain super system frame, the base station 10 may not transmit an N-PDCCH through the subsequent super system frames. Through this configuration, it is possible to suppress communication resources from being expended. In FIG. 25, the example in which an N-PDCCH is transmitted through the super system frames (2) and (4) before and after the super system frame (3) following the mapping pattern has been described. However, an N-PDCCH may be transmitted through the super system frame (2) directly before the super system frame (3) following the mapping pattern or through the super system frame (4) directly after the super system frame (3). In addition, a super system frame used to transmit an N-PDCCH is not limited to the super system frame directly before or directly after the super system frame (3) following the mapping pattern, and an N-PDCCH may be transmitted through a super system frame which is before several frames or after several frames.

Second Modified Embodiment

The UE 20-3 according to the second modified embodiment of the third embodiment treats not only a sub frame of a radio frame following a mapping pattern but also a radio frame of a different super system frame having the SFN identical to that of the corresponding radio frame as a target frame. A concrete description will be made below with reference to FIG. 26.

Figure 26:
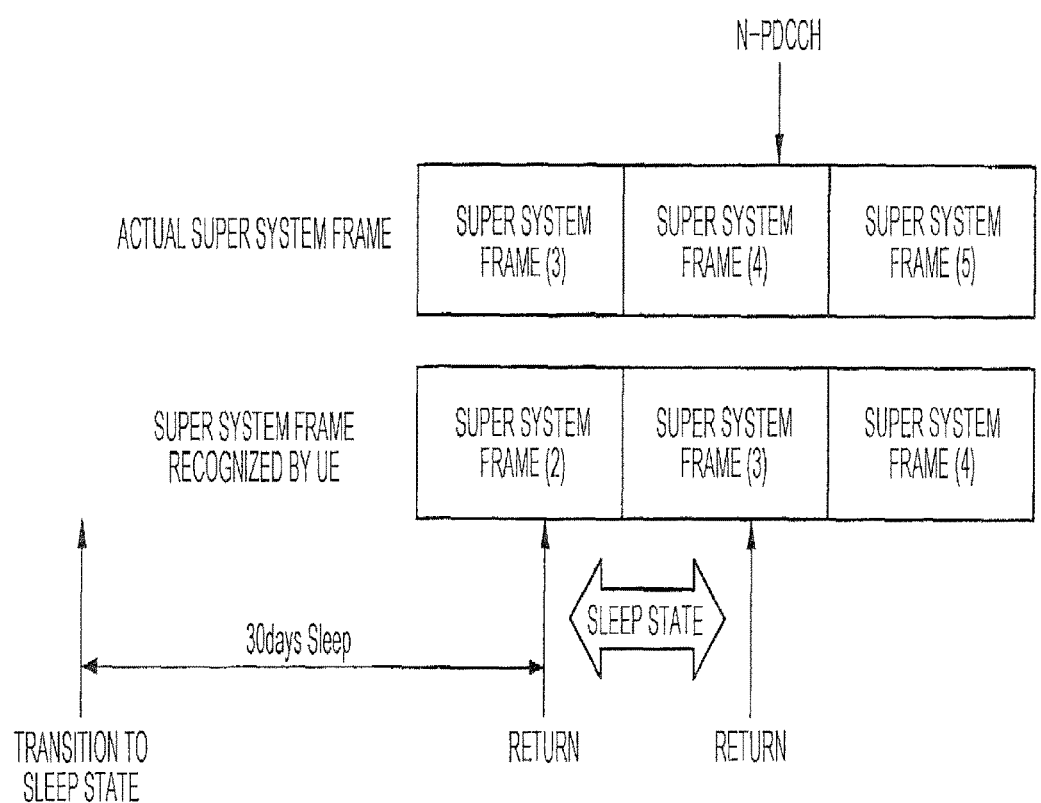
FIG. 26 is an explanatory diagram illustrating a second modified embodiment of the third embodiment.

FIG. 26 is an explanatory diagram illustrating the second modified embodiment of the third embodiment. As illustrated in FIG. 26, the base station 10 transmits an N-PDCCH through a super system frame (4) according to a mapping pattern. However, a super system frame recognized by the UE 20-3 may be deviated from an actual super system frame as illustrated in FIG. 26. In this case, even though the UE 20-3 makes an attempt to receive at the position recognized as the super system frame (4), transmission of an N-PDCCH has already ended.

Thus, the UE 20-3 according to the second modified embodiment may return from the sleep state in order to receive a specified radio frame in the super system frame (2) recognized by the UE 20-3 as illustrated in FIG. 26. Then, when there is no N-PDCCH addressed to the UE 20-3, the UE 20-3 according to the second modified embodiment may transition to the sleep state until its return in order to receive a specified radio frame in the next super system frame (3) recognized by the UE 20-3.

In the example illustrated in FIG. 26, the super system frame (3) recognized by the UE 20-3 is actually the super system frame (4) following the mapping pattern. Thus, the UE 20-3 can receive an N-PDCCH address to itself through the actual super system frame (4). Further, the return from the sleep state according to the second modified embodiment may be performed in two steps as described in the third embodiment.

5. Conclusion

As described above, according to the first embodiment of the present disclosure, the base station 10-1 periodically arranges an N-PDCCH, so that a reduction in the throughput can be suppressed, and the control area can be extended. As a result, the base station 10-1 can accommodate more UEs 20-1 (including an MTC terminal).

Further, according to the second embodiment of the present disclosure, since a period recognizable by the UE 20-2 can be increased, for example, the mapping period of the N-PDCCH can be increased to be larger than the super system frame length.

In addition, according to the third embodiment of the present disclosure, even when the sleep state of the UE 20-3 lasts for a long time, a signal transmitted through a target frame can be appropriately received while power consumption is reduced.

The preferred embodiments of the present disclosure have been described above in detail with reference to the accompanying drawings, whilst the technical scope of the present disclosure is not limited to the above examples. It is apparent that a person skilled in the art may find various alterations and modifications within the scope of technical ideas described in the appended claims, and it should be understood that they will naturally come under the technical scope of the present disclosure.

For example, steps of the processes of the base station 10 and the UE 20 herein need not necessarily be processed in time series according to an order described as a sequence diagram. For example, steps of the processes of the base station 10 and the UE 20 may be processed in an order different from the order described as a sequence diagram or may be processed in parallel.

Further, a computer program may be developed that causes hardware, which is installed in the base station 10 and the UE 20 such as a central processing unit (CPU), a read only memory (ROM), and a random access memory (RAM), to perform functions equivalent to the components of the base station 10 and the UE 20. Further, a storage medium storing the computer program is also provided.

The above-described embodiments, the modified embodiments, and the application examples may be appropriately combined and implemented.

The following configurations also belong to the technical scope of the present disclosure.

According to a communication device embodiment, the device includes a receiving unit that receives a signal from a base station, said signal including a current frame and a target frame; a counting unit that counts a frame period; and a reception control unit that causes the receiving unit to transition to a sleep state, wherein the reception control unit is configured to cause the receiving unit to return from the sleep state before a counting result of the counting unit reaches the target frame and causes the receiving unit to return to the sleep state over a time period based on a difference between the current frame and the target frame.

According to one aspect of the embodiment the reception control unit causes the receiving unit to transition to sleep the state after an update of a system frame number is detected by the reception control unit when a first return from the sleep state has been made.

According to another aspect the reception control unit is configured to make a rough detection of a current system frame number and causes the receiving unit to again enter the sleep state based on the rough detection of the current system frame number.

According to another aspect the reception control unit is configured to make a rough system frame number detection, control a return of the receiving unit from the sleep state during a first radio frame, and subsequently cause the receiving unit to again transition to the sleep state before an update of the rough system frame number is detected by the reception control unit.

According to another aspect the reception control unit causes the receiving unit to receive the signal despite an estimated error of a sleep state duration being longer than a single super system frame.

According to another aspect the receiving unit receives an extension control area of a data portion of the signal through a super subframe according to a mapping pattern and also through a previous super subframe of a radio frame and a next super subframe of a radio frame, each super subframe having a same system frame number.

According to another aspect the reception control unit causes the receiving unit to return from the sleep state to receive a predetermined radio frame in a super system frame, and when there is no extended control area in the signal, the reception control unit transitions the receiving unit to the sleep state until a predetermined radio frame in a next super subframe is detected.

According to another communication device embodiment, the embodiment includes a signal generation unit that generates a signal transmitted in a target frame, said signal causing a receiving device to return from a sleep state before a frame count result reaches a target frame and causes the receiving device to transition to the sleep state over a time period corresponding to a difference between a current frame and the target frame.

According to one aspect of the embodiment said signal generation unit includes in the signal an extended control area in a data area of a subframe.

According to another aspect said signal generation unit includes an extended control area and a data area of a subframe according to a periodic mapping pattern and also in subframes of radio frames of a previous super system frame and a next super system frame having a same system frame number as the radio frame.

According to another aspect said signal generation unit includes in said signal an extended control area in a data area of a subframe according to a periodic mapping pattern, and also in a radio frame of a different super subframe having a same system frame number to the radio frame.

According to a method embodiment, the method includes receiving a signal; counting with a counter a frame period; transitioning a receiving unit to a sleep state; returning the receiving unit from the sleep state to an operational state before a counting result of the counting reaches a target frame; and transitioning the receiving unit again to the sleep state over a time period corresponding to a difference between a current frame and the target frame.

According to one aspect, the method includes detecting a system frame number that triggers the transitioning the receiving unit again to the sleep state.

According to another aspect, the method further includes detecting a rough system frame number and responding by triggering said transitioning the receiving unit again to the sleep state.

According to another aspect, the method further includes searching for a detection of a rough system frame number in the radio frame and when not detected, causing the receiving unit to transition to the sleep state based on a difference between a system frame number of the radio frame and a system frame number of another radio frame.

According to another aspect, the method further includes estimating an oscillator error and converting the oscillator error and sleep time length into a predetermined frame number; counting system frame numbers in the signal; and before reaching the predetermined frame number in the counting, returning the receiving unit to the operational state.

According to another aspect, the method further includes receiving an extended control area in a data area of a subframe according to a mapping pattern for a super subframe; and receiving the extended control area in a data area of a previous super system frame and in a data area of a next super system frame.

According to another aspect, the method further includes receiving a radio frame of a different super system frame having a system frame number identical to a system frame number of the radio frame.

According to another method embodiment, the method includes transmitting a signal to a communication device in a target frame that causes the communication device to return a receiving unit from a sleep state to an operational state before a frame count result reaches the target frame, and causing the receiving unit to transition to the sleep state again over a time period corresponding to a difference between a current frame and the target frame.

According to one aspect, the method includes transmitting an extended control area in a data area of a subframe according to a periodic mapping pattern of the radio frame; and transmitting the extended control area in a subframe of a radio frame of a previous super system frame and in a radio frame of a next super system frame having a same system frame number as the radio frame.

According to another aspect, the method further includes transmitting the subframe of the radio frame according to a periodic mapping pattern and transmitting an extended control area in a data area of another subframe of the radio frame of a different super frame having a system frame number identical to that of the radio frame.

According to a system embodiment, the system includes a base station that includes a signal generation unit that generates a signal transmitted in a target frame, said signal causing a receiving device to return from a sleep state before a frame count result reaches a target frame and causes the receiving device to transition to the sleep state over a time period corresponding to a difference between a current frame and the target frame; and a communication device that includes a receiving unit that receives a signal from a base station, said signal including a current frame and a target frame, a counting unit that counts a frame period, and a reception control unit that causes the receiving unit to transition to a sleep state, wherein the reception control unit is configured to cause the receiving unit to return from the sleep state before a counting result of the counting unit reaches the target frame and causes the receiving unit to return to the sleep state over a time period based on a difference between the current frame and the target frame.

According to one aspect, the reception control unit causes the receiving unit to transition to the sleep state after an update of a system frame number is detected by the reception control unit when a first return from the sleep state has been made.

According to another aspect the reception control unit is configured to make a rough detection of a current system frame number and causes the receiving unit to again enter the sleep state based on the rough detection of the current system frame number.

According to another aspect the reception control unit is configured to make a rough system frame number detection, control a return of the receiving unit from the sleep state during a first radio frame, and subsequently cause the receiving unit to again transition to the sleep state before an update of the rough system frame number is detected by the reception control unit.

According to another aspect the reception control unit causes the receiving unit to receive the signal despite an estimated error of a sleep state being longer than a single super system frame.

According to another aspect the receiving unit receives an extension control area of a data portion of the signal through a super subframe according to a mapping pattern and also through a previous super subframe of a radio frame and a next super subframe of a radio frame, each super subframe having a same system frame number.

According to another aspect the reception control unit causes the receiving unit to return from the sleep state to receive a predetermined radio frame in a super system frame, and when there is no extended control area in the signal, the reception control unit transitions the receiving unit to the sleep state until a predetermined radio frame in a next super subframe is detected.

According to another aspect said signal generation unit includes in the signal an extended control area in a data area of a subframe.

According to another aspect said signal generation unit includes an extended control area and a data area of a subframe according to a periodic mapping pattern and also in subframes of radio frames of a previous super system frame and a next super system frame having a same system frame number as the radio frame.

According to another aspect said signal generation unit includes in said signal an extended control area in a data area of a subframe according to a periodic mapping pattern, and also in a radio frame of a different super subframe having a same system frame number to the radio frame.

REFERENCE SIGNS LIST 10, 10-1, 10-2 Base station
20, 20-1, 20-2, 20-3 UE
104 Antenna array
110 Radio processing unit
120 DA/AD converting unit
130 Uplink signal detecting unit
140, 141 Downlink signal generating unit
152 SFN counter
156 Mapping storage unit
160, 161 N-PDCCH control unit
170 Extension counter
204 Antenna array
210 Radio processing unit
220 DA/AD converting unit converting unit
230 Uplink signal generating unit
240 Downlink signal detecting unit
252 Internal counter
256, 258 SFN counter
260 Mapping storage unit
264, 266, 268 Reception control unit
270 Extension counter
280 Possible error estimating unit

The invention claimed is:

1. A communication device comprising:
    a receiver configured to receive a signal from a base station;
    circuitry configured to
        count a frame period; and
        cause the receiver to transition from a sleep state before a counting result of the circuitry reaches a target frame;
        identify a system frame number of a current frame; and
        cause the receiver to transition to the sleep state over a time period based on a difference between the system frame number of the current frame and a system frame number of the target frame.

2. The communication device of claim 1, wherein the circuitry is configured to cause the receiver to transition to the sleep state after an update of the system frame number of the current frame is detected by the circuitry when a first return from the sleep state has been made.

3. The communication device of claim 1, wherein the circuitry is configured to make a rough detection of the system frame number of the current frame and cause the receiver to again enter the sleep state based on the rough detection of the system frame number of the current frame.

4. The communication device of claim 1, wherein the circuitry is configured to make a rough system frame number detection, control a return of the receiver from the sleep state during a first radio frame, and subsequently cause the receiver to again transition to the sleep state before an update of the rough system frame number is detected by the circuitry.

5. The communication device of claim 1, wherein the circuitry is configured to cause the receiver to receive the signal despite an estimated error of a sleep state duration being longer than a single super system frame.

6. The communication device of claim 5, wherein the receiver is configured to receive an extension control area of a data portion of the signal through a super subframe according to a mapping pattern and also through a previous super subframe of a radio frame and a next super subframe of a radio frame, each super subframe having a same system frame number.

7. The communication device of claim 5, wherein the circuitry is configured to cause the receiver to return from the sleep state to receive a predetermined radio frame in a super system frame, and when there is no extended control area in the signal, the circuitry is configured to transition the receiver to the sleep state until a predetermined radio frame in a next super subframe is detected.

8. A communication device comprising:
    circuitry configured to
        generate a signal, said signal causing a receiver to transition from a sleep state before a frame count result reaches a target frame; and
        cause the receiver to transition to the sleep state over a time period corresponding to a difference between a system frame number of a current frame and a system frame number of the target frame.

9. The communication device of claim 8, wherein said circuitry is configured to include in the signal an extended control area in a data area of a subframe.

10. The communication device of claim 8, wherein said circuitry is configured to include an extended control area in a data area of a subframe according to a periodic mapping pattern of a first radio frame and also in subframes of radio frames of a previous super system frame and a next super system frame having a same system frame number as the first radio frame.

11. The communication device of claim 8, wherein said circuitry is configured to include in said signal an extended control area in a data area of a subframe according to a periodic mapping pattern, and also in a radio frame of a different super subframe having a same system frame number to the radio frame.

12. A communication method comprising:
receiving, by a receiver, a signal;
counting with a counter a frame period of the signal;
transitioning the receiver to a sleep state;
transitioning, by circuitry, the receiver from the sleep state to an operational state before a counting result of the counting reaches a target frame;
identifying a system frame number of a current frame; and
transitioning, by the circuitry, the receiver again to the sleep state over a time period corresponding to a difference between the system frame number of the current frame and a system frame number of the target frame.

13. The communication method of claim 12, further comprising:
detecting a system frame number that triggers the transitioning the receiver again to the sleep state.

14. The communication method of claim 12, further comprising:
detecting a rough system frame number and responding by triggering said transitioning the receiver again to the sleep state.

15. The communication method of claim 12, further comprising:
searching for a detection of a rough system frame number in a radio frame and when not detected, causing the receiver to transition to the sleep state based on a difference between a system frame number of the radio frame and a system frame number of another radio frame.

16. The communication method of claim 12, further comprising:
receiving an extended control area in a data area of a subframe according to a mapping pattern for a super subframe; and
receiving the extended control area in a data area of a previous super system frame and in a data area of a next super system frame.

17. The communication method of claim 12, further comprising:
receiving a radio frame of a different super system frame having a system frame number identical to a system frame number of the radio frame.

18. A communication method comprising:
transmitting, by circuitry, a signal to a communication device that causes the communication device to return a receiver from a sleep state to an operational state before a frame count result reaches a target frame, and causes the receiver to transition to the sleep state again over a time period corresponding to a difference between a system frame number of a current frame and a system frame number of the target frame.

19. The communication method of claim 18, further comprising:
transmitting an extended control area in a data area of a subframe according to a periodic mapping pattern of a first radio frame; and
transmitting the extended control area in a subframe of a radio frame of a previous super system frame and in a radio frame of a next super system frame having a same system frame number as the first radio frame.

20. The communication method of claim 18, further comprising:
transmitting a subframe of a radio frame according to a periodic mapping pattern and transmitting an extended control area in a data area of another subframe of the radio frame of a different super frame having a system frame number identical to that of the radio frame.

21. A communication system comprising:
a base station that includes first circuitry configured to generate a signal, said signal causes a receiver to transition from a sleep state before a frame count result reaches a target frame and causes the receiver to transition to the sleep state over a time period corresponding to a difference between a system frame number of a current frame and a system frame number of the target frame; and
a communication device that includes
the receiver configured to receive the signal from the base station, and
second circuitry configured to
count a frame period,
cause the receiver to transition from the sleep state before a counting result of the second circuitry reaches the target frame,
identify the system frame number of the current frame, and
cause the receiver to transition to the sleep state over the time period based on the difference between the system frame number of the current frame and the system frame number of the target frame.

* * * * *